US012760690B2

(12) United States Patent
Blake

(10) Patent No.: US 12,760,690 B2
(45) Date of Patent: Oct. 13, 2026

(54) ELECTRONIC THROTTLE CONTROL OF SNOWMOBILE WITH TWO-STROKE INTERNAL-COMBUSTION ENGINE

(71) Applicant: Polaris Industries Inc., Medina, MN (US)

(72) Inventor: Dallas Blake, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/825,014

(22) Filed: Sep. 5, 2024

(65) Prior Publication Data

US 2025/0092837 A1 Mar. 20, 2025

Related U.S. Application Data

(60) Provisional application No. 63/583,312, filed on Sep. 18, 2023.

(51) Int. Cl.

*F02D 41/00* (2006.01)
*F02B 75/02* (2006.01)
*F02D 9/10* (2006.01)
*F02D 41/22* (2006.01)

(Continued)

(52) U.S. Cl.

CPC .......... *F02D 41/0002* (2013.01); *F02B 75/02* (2013.01); *F02D 9/1065* (2013.01); *F02D 41/22* (2013.01); *F02D 41/38* (2013.01); *F02P 5/1502* (2013.01); *F02B 2075/025* (2013.01); *F02D 2200/101* (2013.01); *F02D 2200/60* (2013.01)

(58) Field of Classification Search

CPC ........ F02D 41/0002; F02D 9/105; F02D 9/08; F02D 9/10; F02D 9/106; F02D 9/1065

USPC .............. 123/406.53, 406.52, 406.5, 406.51; 701/101, 110, 103

See application file for complete search history.

(56) References Cited

U.S. PATENT DOCUMENTS 5,479,909 A 1/1996 Blakeslee et al.
6,158,411 A 12/2000 Morikawa
6,345,604 B1 2/2002 Ahrns et al.

(Continued)

FOREIGN PATENT DOCUMENTS

JP 2009024700 A * 2/2009 ............ F02D 11/107
WO WO-2019226883 A1 * 11/2019 ............... F02D 9/10

*Primary Examiner* — George C Jin
*Assistant Examiner* — Teuta B Holbrook
(74) *Attorney, Agent, or Firm* — Merchant & Gould P.C.

(57) ABSTRACT

An electronic throttle-control system that includes: an electronic control unit (ECU) including a processor and a memory storing a throttle-control translation map; a throttle-input sensor in electrical communication with the ECU and configured to sense an input from an operator-actuated throttle device; and a 2-stroke internal-combustion engine. The 2-stroke internal-combustion engine may include: an electronic throttle-valve actuator in electrical connection with the ECU; a throttle body for controlling airflow to combustion chambers of the engine and defining first and second throttle bores; first and second throttle valves in the bores; and a throttle valve control shaft coupled to the throttle valves and the actuator, such that movement of the actuator causes the throttle valve control shaft to rotate and move the first and second throttle valves; and a throttle-position sensor in electrical communication with the ECU sensing an actual position of the first and second throttle valves.

17 Claims, 17 Drawing Sheets

(51) Int. Cl.

| | |
|---|---|
| ***F02D 41/38*** | (2006.01) |
| ***F02P 5/15*** | (2006.01) |

(56) References Cited

U.S. PATENT DOCUMENTS

| | | | | |
|---|---|---|---|---|
| 6,733,350 | B2 * | 5/2004 | Lida ........................ | B63H 21/22 440/87 |
| 7,311,082 | B2 | 12/2007 | Yokoi | |
| 7,315,779 | B1 * | 1/2008 | Rioux ................... | F02D 31/006 123/352 |
| 7,980,219 | B2 * | 7/2011 | Sano ....................... | F02D 9/105 123/184.53 |
| 8,590,654 | B2 | 11/2013 | Kerner et al. | |
| 8,733,773 | B2 | 5/2014 | Sampson | |
| 8,763,745 | B2 | 7/2014 | Nagao et al. | |
| 11,110,994 | B2 | 9/2021 | Hedlund et al. | |
| 2006/0272599 | A1 * | 12/2006 | Johnson ............... | F02M 69/046 123/65 PE |
| 2010/0095930 | A1 | 4/2010 | Wong | |
| 2014/0332293 | A1 | 11/2014 | Conn | |
| 2015/0197149 | A1 | 7/2015 | Hedlund et al. | |
| 2017/0159598 | A1 * | 6/2017 | Schuehmacher ... | F02D 41/1446 |
| 2019/0120166 | A1 * | 4/2019 | Schuehmacher ..... | F02D 41/047 |
| 2022/0397068 | A1 * | 12/2022 | Buchwitz ................ | F02D 9/105 |

* cited by examiner

ELECTRONIC THROTTLE CONTROL OF SNOWMOBILE WITH TWO-STROKE INTERNAL-COMBUSTION ENGINE

CROSS REFERENCE TO RELATED APPLICATIONS

This application claims the benefit of U.S. Provisional Patent Application No. 63/583,312 filed Sep. 18, 2023, entitled ELECTRONIC THROTTLE CONTROL OF SNOWMOBILE WITH TWO-STROKE INTERNAL-COMBUSTION ENGINE, the contents of which are expressly incorporated herein by reference.

BACKGROUND

As compared to snowmobiles with 4-stroke internal-combustion engines, snowmobiles with 2-stroke internal-combustion engines are much lighter and maneuverable, and provide greater power-to-weight ratios. Further, snowmobiles with 2-stroke engines may start easier in cold weather. For these and other reasons, many consumers choose 2-stroke snowmobiles over 4-stroke snowmobiles. However, unlike modern 4-stroke snowmobiles which employ electronic throttle control (ETC), known 2-stroke snowmobiles still utilize mechanical throttle controls, such as a throttle cable connecting the operator throttle lever to the throttle valve in the engine throttle body. Consequently, 2-stroke snowmobiles cannot provide the many advantages offered by ETC.

SUMMARY

Embodiments of the present disclosure include an electronic throttle-control system for a snowmobile. In one such embodiment, the electronic throttle control system includes: an electronic control unit (ECU) including a processor and a memory device storing at least one throttle-control translation map; a throttle-input sensor in electrical communication with the ECU and configured to sense an input from an operator-actuated throttle device; and a 2-stroke internal-combustion engine. The 2-stroke internal-combustion engine may include: an electronic throttle-valve actuator in electrical connection with the ECU and having an actuator motor and gear train; a throttle body for controlling airflow to one or more combustion chambers of the 2-stroke internal-combustion engine, the throttle body defining a first throttle bore and a second throttle bore; a first throttle valve in the first throttle bore and a second throttle valve in the second throttle bore; and a throttle valve control shaft coupled to the first throttle valve and the second throttle valve, and to the gear train, such that movement of the actuator motor and gear train causes the throttle valve control shaft to rotate and move the first and second throttle valves; a throttle-position sensor in electrical communication with the ECU and configured to sense an actual position of the first and second throttle valves. Further, the ECU may be configured to receive a signal representing a throttle-position input from the throttle-input sensor and to determine a throttle-demand position corresponding to a position of the first throttle valve in the first throttle bore and a position of the second throttle valve in the second throttle bore, based on the throttle-position input and throttle-control translation map.

Another embodiment of the disclosure is a method of controlling a starting mode of snowmobile having an electronic-control unit (ECU) with a processor, and a 2-stroke combustion engine with an electronic throttle body having a first throttle valve, a second throttle valve, a throttle-position sensor, and an actuator for actuating the first and second throttle valves. The method includes the steps of: determining whether an electronic throttle body drive-voltage generated by the 2-stroke combustion engine is above a threshold voltage; determining whether an engine speed of the 2-stroke combustion engine is above a first engine-speed threshold; when the generated voltage is at or above the critical threshold voltage and the speed of the 2-stroke combustion engine is above a threshold engine-speed threshold, setting a throttle position of the first throttle valve and the second throttle valve to a neutral-throttle position; after a predetermined period of time, determine whether the engine speed is greater than a second engine-speed threshold; and when the engine speed is greater than the second engine-speed threshold, changing a position of the first throttle valve and the second throttle valve from the neutral-throttle position to an initial throttle-operating position, by controlling the actuator with the processor of the ECU.

Yet another embodiment of the disclosure includes a method of controlling a snowmobile having an electronic-control unit (ECU) with a processor, a memory storing one or more throttle-control translation maps, and a 2-stroke combustion engine with an electronic throttle body having a first throttle valve, a second throttle valve, a throttle-position sensor, an actuator for actuating the first and second throttle valves, and an engine-speed sensor. In this embodiment, the method includes: storing a predetermined idle-speed throttle-valve position and the one or more throttle-control translation maps in the memory; determining with the ECU a throttle-demand valve position, the throttle-demand valve position corresponding to a throttle-demand valve effective area of the first and second throttle valves; comparing the throttle-demand valve position to the predetermined idle-speed throttle-valve position; receiving at the ECU, an output of the engine-speed sensor indicating an actual engine speed of the 2-stroke internal-combustion engine; comparing the actual engine speed with a predetermined engine-idle speed; selecting a throttle-control translation map stored in the memory when the throttle-demand position effective flow area is greater than the predetermined idle-speed throttle position effective flow area and when the actual engine speed is greater than the predetermined idle engine speed; controlling the actuator using the ECU to set a first position of the first throttle valve in the first throttle bore and a first position of the second throttle valve in the second throttle bore based on the selected throttle-control translation map; determining whether an engine fault is present and controlling the actuator using the ECU to set a second position of the first throttle valve in the first throttle bore and a second position of the second throttle valve in the second throttle bore when a fault is present; and determining whether a ground speed or engine speed exceeds a maximum speed limit and controlling the actuator using the ECU to set a third position of the first throttle valve in the first throttle bore and a third position of the second throttle valve in the second throttle bore to reduce ground speed or engine speed to be less than the maximum speed limit.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The disclosure can be understood in consideration of the following detailed description of various embodiments in connection with the accompanying drawings, in which.

DETAILED DESCRIPTION

Figure 1:
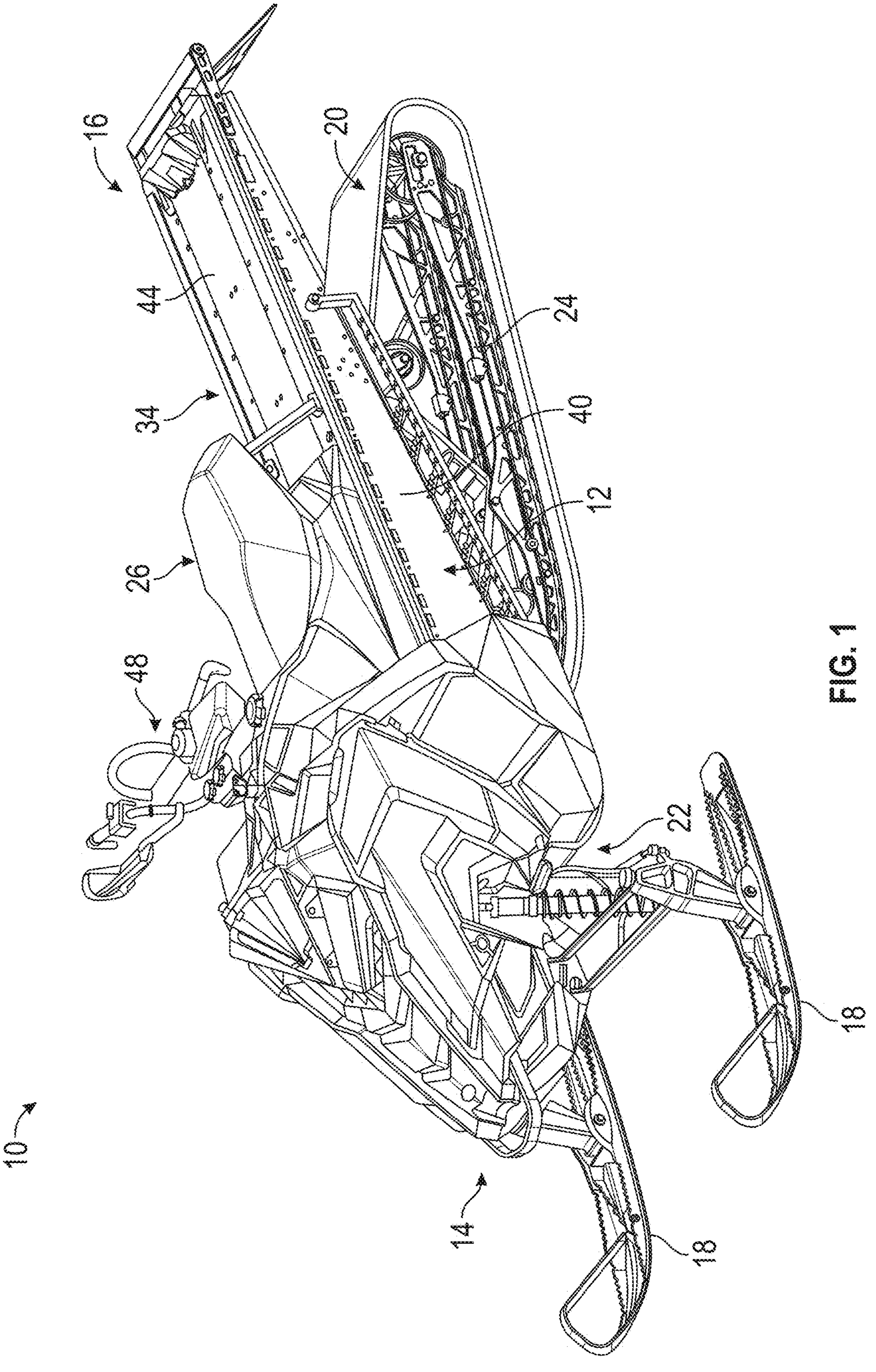
FIG. 1 is a perspective view of a snowmobile having a two-stroke internal-combustion engine with an electronic throttle-control system, according to an embodiment of the disclosure.

For the purposes of understanding the disclosure, reference will now be made to the embodiments illustrated in the drawings, which are described below. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all combinations, modifications, equivalents, and alternatives falling within the spirit and scope of the invention as defined by the appended claims.

Electronic throttle control (ETC), while prevalent on 4-stroke powersports products, has never successfully been implemented on a 2-stroke snowmobile. Over time, more safety features are being implemented on 2-stroke snowmobiles, and their versatility is growing. However, conventional methods for manipulating the feel and/or use of the snowmobile, as well as means of power limiting the snowmobile, have not risen to the level to provide for a true multipurpose 2-stroke snowmobile. Dual-bore, on-throttle, electrically-driven ETC systems herein directed to a 2-stroke snowmobile allow for reduced mass, more precise control and faster response, in addition to reduced throttle-pull effort, thereby providing significantly improved vehicle-feel manipulation, speed limiting, power limiting, start and idle improvements as compared to cable-driven mechanically-actuated throttle-body systems of known 2-stoke snowmobiles.

Further, the ability to create a plurality of drive modes on a 2-stroke engine facilitates implementation of more effective vehicle and engine speed-limiting options to control the power output of the engine to meet the needs of riders of a wider range of skill levels. For example, a reduced maximum-throttle opening with a slower ramp between input and output command can serve as an operational mode for entry-level or inexperienced riders while a 1:1 translation between input and output can serve as a operational mode for experienced riders. Furthermore a throttle map in which the throttle opens further than the user command at certain operating conditions can be used for racing or mountain applications to enhance throttle response. Additionally, the use of ETC can serve as a user-adjustable speed-limiting function that can be used with or without a parental-lock passcode through the gauge to limit vehicle speed so that the operator can use the vehicle according to one of the aforementioned throttle-control modes up to a programable vehicle speed, at which point the throttles will begin to close to maintain the speed.

Furthermore, the use of ETC can be used as a vehicle power-limiting function for circumstances such as: engine overheat, exhaust temperature overheat, transmission low range operation, detonation protection, low-fuel operation and vehicle speed limiting for track durability. Embodiments of snowmobiles with 2-stroke ETC as described herein increase the operational capacity of a single vehicle that is usable for a wide range of operators from the inexperienced to the expert.

Embodiments of the disclosure, and as described in further detail below, include a snowmobile with a 2-stroke internal-combustion engine having a dual bore electronic throttle body with a single shaft connecting the two plates/valves to an electric motor output drive that is used to control the airflow going into the engine. A handlebar mounted throttle-input sensor is used to determine throttle input by the user. An ECU is then able to translate this user input to a throttle body command through a plurality of throttle-control translation maps that are used to alter the performance characteristics of the engine. The plurality of translation maps are used to alter the feel of the vehicle by limiting engine airflow and/or rate at which throttle is applied relative to the users input. A map which features a smoother translation between the user input and the throttle output can be utilized to enhance low speed drivability when towing or navigating tight operating conditions. Additionally, ETC can be used for vehicle speed limiting on mountain snowmobiles equipped with deeper lug tracks as a means of preventing or mitigating the delamination of the track lugs causing track failure.

ETC can also serve as an effective means of power limiting and can be used independently or in conjunction with utilization of the exhaust valves as a means of controlling the airflow through the engine and therefore, the power output of the engine. In the case of elevated engine water or exhaust gas temperature, the exhaust valves may be forced down to limit airflow of the engine or could be used in conjunction with the ETC to force operation of the engine into a region more likely to mitigate this circumstance; usually by limiting power of the engine to reduce heat production both through heat rejection to the cooling system and heat generation through combustion. In the case of engine detonation, instead of forcing the exhaust valves down, a progressive drop in maximum operating throttle position can be implemented to mitigate detonation while still allowing the maximum power allowable for the given circumstances which allows for a less intrusive means of power limiting and engine protection. In the case of a sensor or vehicle fault, a maximum allowable throttle position that overrides the translation maps to allow the rider to limp home for the purpose of repairs or diagnostics to minimize the potential for engine failure may be implemented. For example, sensors may sense and indicate low-fuel pressure, or other engine faults. Vehicle faults may include non-engine related faults, including faults caused by operation of snowmobile 10, such as certain brake-throttle interactions, such as operating the throttle while applying the brakes for period of time.

Furthermore, the use of ETC allows for variable throttle angle to be used for starting of the engine to control the flare of the engine in starting conditions according to elevation of operation. Additionally, the ETC can be used as closed loop idle control mechanism to control the engine speed according to a calibratable setpoint.

Figure 2:
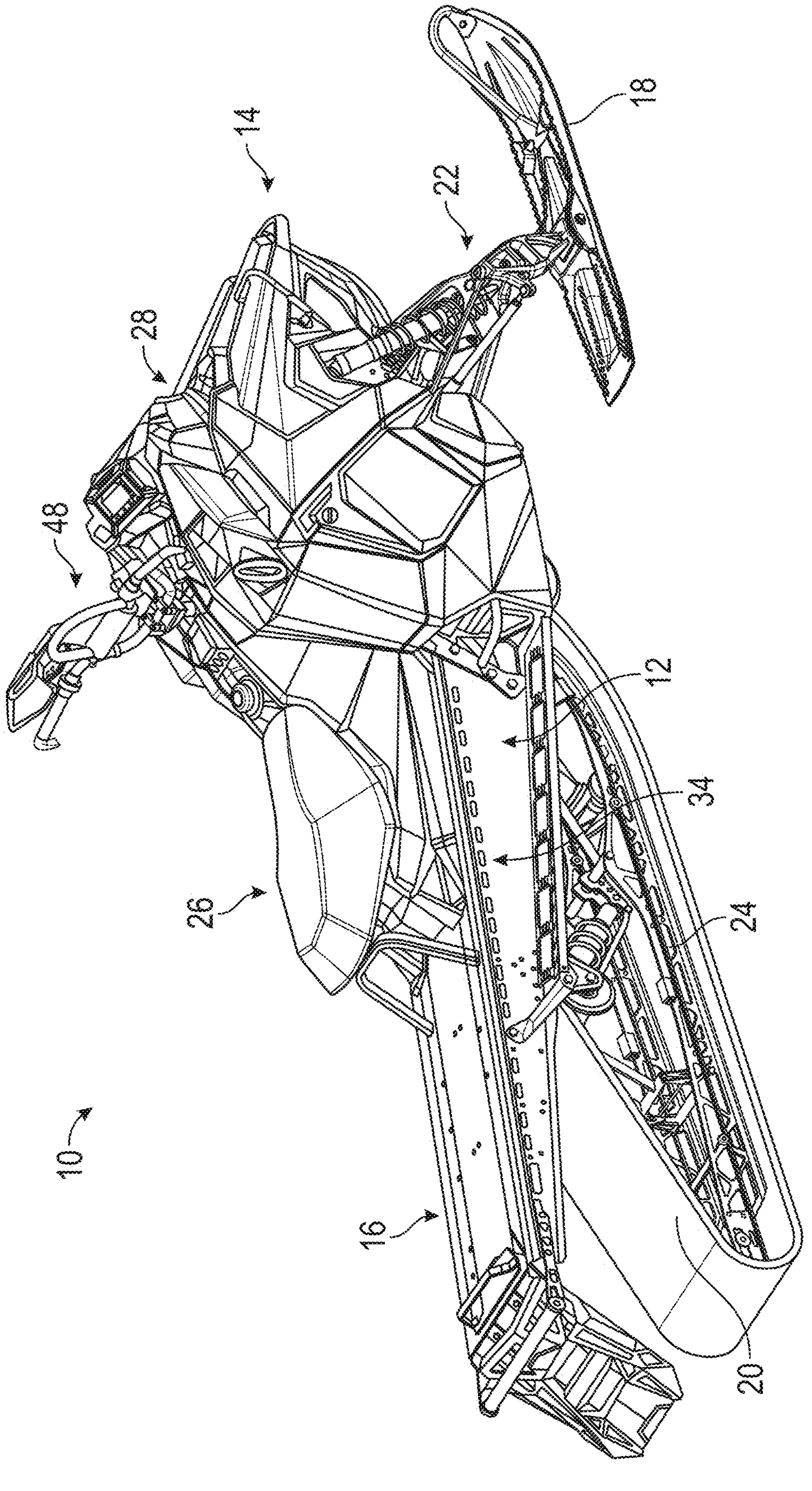
FIG. 2 is another perspective view of the snowmobile of FIG. 1.
Figure 3:
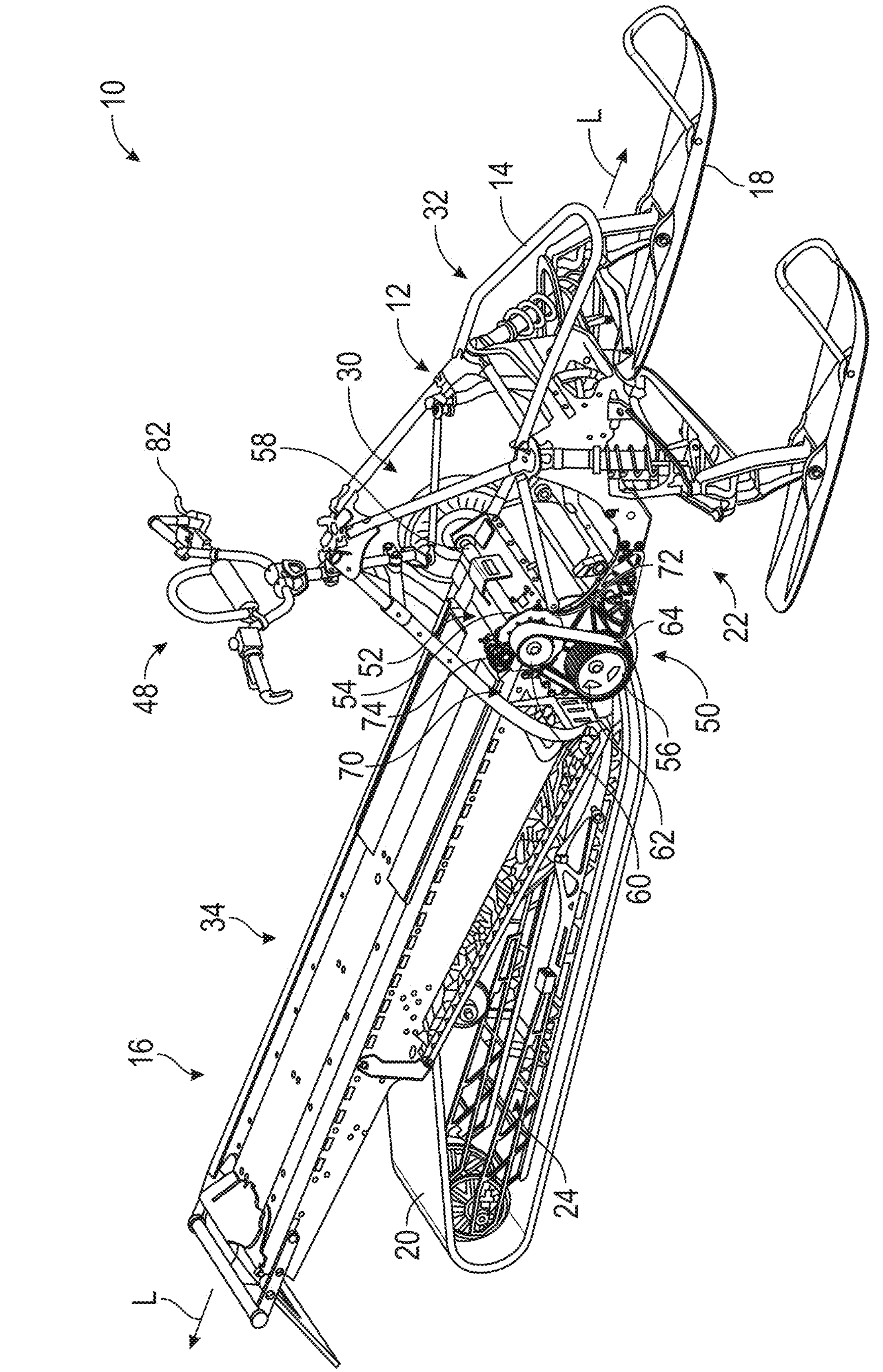
FIG. 3 is a perspective view of the snowmobile of FIG. 1 with selected bodywork removed.

Referring to FIGS. 1-3, an embodiment of snowmobile 10 includes chassis or frame assembly 12 having front frame portion 14 and rear frame portion 16. Front frame portion 14 is supported by skis 18, and rear frame portion 16 is supported by endless track 20. Front skis 18 are operably coupled to front suspension assembly 22, and endless track 20 cooperates with rear suspension assembly 24 during operation of snowmobile 10. Snowmobile 10 also includes seat assembly 26 having a seating portion for at least a driver and an optional seating portion for a passenger positioned rearward of the driver portion.

Snowmobile 10 further includes body assembly 28 comprised of multiple body panels covering certain components and systems of snowmobile 10, including portions of frame assembly 12, front suspension assembly 22, and powertrain assembly 30.

Referring specifically to FIG. 3, frame assembly 12 includes a bulkhead 32 coupled to a tunnel 34 extending along a longitudinal axis L of snowmobile 10. Bulkhead 32 supports a steering assembly 48.

Powertrain assembly 30 provides power to endless track 20 to move snowmobile 10. Powertrain assembly 30 is supported by front frame portion 14 and includes 2-stroke, internal-combustion engine 50 and a transmission (not shown).

As will be understood by those of ordinary skill in the art, two-stroke or 2-stroke (sometimes referred to as "2-cycle"), internal-combustion engine 50 includes various systems and components, such as an engine block with a combustion chamber, pistons, intake and exhaust valves, a fuel system, which may be an electronic fuel-injection (EFI) system, an electrical system, a cooling system, an exhaust system, and various sensors, such as a throttle position sensor, engine-speed sensor, crank position sensor, and so on. Various embodiments of snowmobiles, snowmobile engines, systems and so on are known in the art and are described in U.S. Pat. No. 8,590,654, issued Nov. 26, 2013 and entitled "Snowmobile," in U.S. Pat. No. 8,733,773, issued May 27, 2014 and entitled "Snowmobile Having Improved Clearance for Deep Snow," in U.S. Patent Pub No. 2014/0332293A1, published Jul. 23, 2014 and entitled "Snowmobile," and in U.S. Pat. No. 11,110,994, issued Sep. 7, 2021 and entitled "Snowmobile," all of which are assigned to Polaris Industries Inc., and all of which are incorporated herein by reference in their entireties.

Powertrain assembly 30 also includes a drivetrain assembly 52 comprising a countershaft or jackshaft 54 and a track driveshaft 56. Jackshaft 54 is operably coupled with the transmission and, in embodiments using a continuously variable transmission ("CVT"), is operably coupled with the secondary or driven pulley. Jackshaft 54 also is operably coupled to driveshaft 56 through a belt/chain drive assembly 58. Belt/chain drive assembly 58 includes a drive sprocket 60, a driven sprocket 62, and a belt or chain 64 rotatably entrained with drive and driven sprockets 60, 62. Driven sprocket 62 is coupled with driveshaft 56. In operation, the crankshaft (not shown) of engine 50 drives the transmission, thereby causing the transmission to output power (e.g., rotation) to jackshaft 54. Jackshaft 54 then drives driveshaft 56 through belt/chain drive assembly 58. As a result, driveshaft 56 rotates within a portion of tunnel 34.

Driveshaft 56 engages an inner surface of track 20, such that as jackshaft 54 drives driveshaft 56, through belt/chain drive assembly 58, driveshaft 56 causes track 20 to rotate and move snowmobile 10.

An engine 50 speed is controlled, at least in part, by the operator controlling throttle-input device 80, which may be a throttle lever or similar. A position of the throttle-input device 81 may be detected by a throttle-input sensor 140 (discussed further with respect to FIG. 7) that senses a position of throttle-input device 80.

Snowmobile 10 also includes brake system 70, which may be a dry or wet brake system controlled by brake lever 82. In an embodiment, brake system 70 is a hydraulic disc-brake system, and is coupled to the transmission. Brake system 70 may be directly coupled to jackshaft 54, or to other portions of the transmission.

Figure 4:
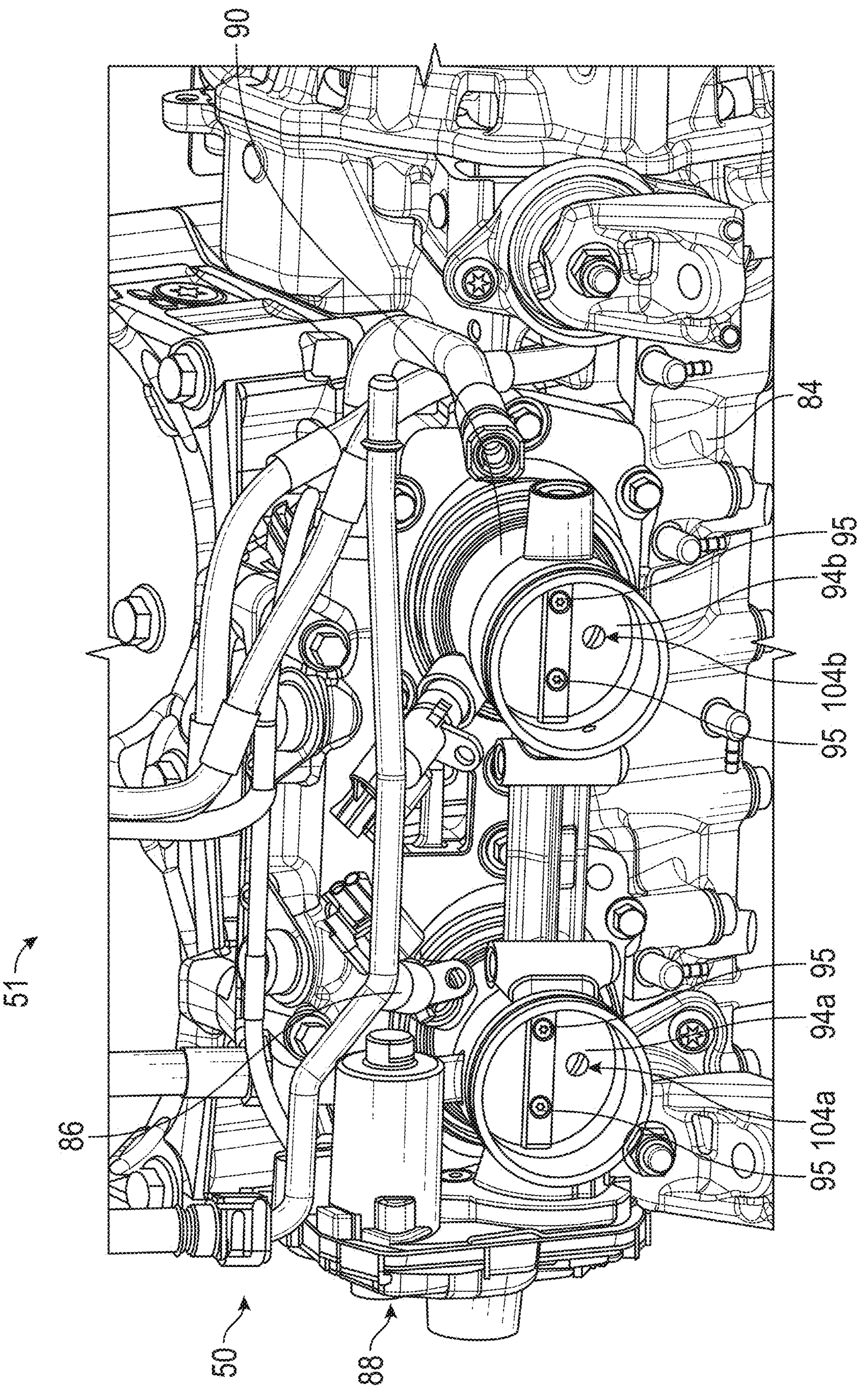
FIG. 4 is a perspective view of a 2-stroke internal-combustion engine with an electronic throttle-control system, according to an embodiment of the disclosure.

Referring to FIG. 4, an embodiment of 2-stroke, internal-combustion engine 50 with electronic throttle control (ETC) is depicted. In this embodiment, 2-stroke, internal-combustion engine 50 includes engine block 84 defining one or more combustion chambers with pistons therein, fuel-injection system 86, and electronic throttle-control system 88. In an embodiment, engine 50 with electronic throttle-control system 88 forms an electronic throttle-control system 51 for snowmobile 10.

In the embodiment depicted, 2-stroke, internal-combustion engine 50 is a two-cylinder engine, with two combustion chambers and two pistons, though it will be understood that 2-stroke, internal-combustion engine 50 may comprise a single-cylinder engine, or may comprise more than two combustion chambers, based on various engine factors, including engine size and desired engine power output.

Figure 5:
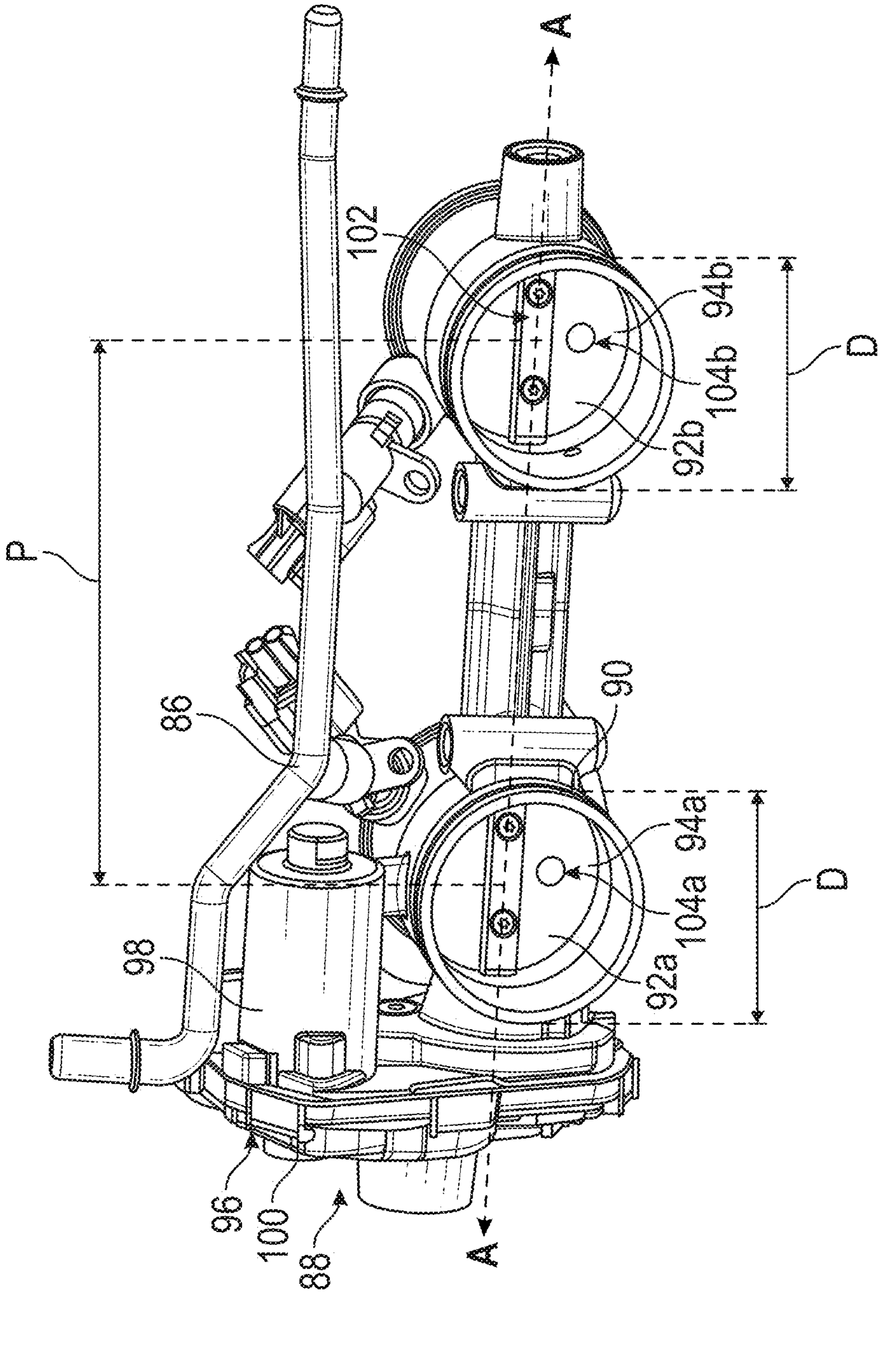
FIG. 5 is a perspective view of an electronic throttle-control system of FIG. 4.

Referring also to FIG. 5, electronic throttle-control system 88 configured for a 2-stroke, internal-combustion engine includes throttle body 90 defining a pair of throttle bores 92, depicted as first throttle bore 92*a* and second throttle bore 92*b*, a pair of throttle valves 94, depicted as first throttle valve 94*a* and second throttle valve 94*b*, throttle valve actuator 96 with actuator motor 98 and actuator gear train 100, and actuator shaft 102. Electronic throttle-control system 88 also includes a throttle-valve position sensor 142 (see FIG. 7) for detecting a position of throttle valves 94.

In the embodiment depicted, throttle body 90 defines two throttle bores 92 and two throttle valves 94, one for each combustion chamber, though in other embodiments, throttle body 90 may define a single throttle bore 92 with a single throttle valve 94, or more than two throttle bores with valves, depending on various engine design factors, including the number of combustion chambers defined by engine 50. In an embodiment, throttle body 90 defines one bore 92 with one throttle valve 94, for each combustion chamber of engine 50.

As will be understood by those of ordinary skill in the art, each throttle bore 92 forms a passageway or channel for combustion air to flow into engine 50 combustion chambers. In embodiments, each throttle bore 92 defines a generally cylindrical through passageway, with a circular opening. Each throttle bore 92, including bores 92*a* and 92*b*, may be of substantially equal size, with a same or similar-sized opening. In an embodiment, a diameter D of each throttle bore 92 may be in a range of about 30 mm to about 50 mm.

Throttle valves 94, including valves 94*a* and 94*b*, in an embodiment, comprise butterfly valves that may form a substantially flat, circular disc or plate. Each butterfly valve 94 fits at least partially within an interior portion of its respective bore 92, depending on the rotated position of the valve. Each butterfly valve 94 may also define a minimum-air flow, or idle-air flow, hole 104, including holes 104*a* and 104*b*, to allow for some airflow through valve 94, even when the valve is in a closed position. Each throttle valve 94 is centered within its respective throttle bore 92, such that when each throttle valve 94 is in a closed position, as depicted in FIGS. 4 and 5, with the exception of air flow through holes 104, minimal or no air flows through throttle bore 92. In other words, the edges of throttle valves 92 abut or are very near, inside surfaces defining throttle bodies 92 such that very little or no air passes around throttle valve 94 when in the closed position.

First and second throttle valves 94*a* and 94*b* are distributed along a lateral axis A, separated by a center-to-center pitch distance P. In an embodiment, pitch P is in a range of about 100 mm to 200 mm; in another embodiment, pitch P is in a range of about 130 mm to 140 mm; in another embodiment, pitch P is approximately 130 mm. Pitch P may be increased to accommodate larger 2-stroke engines which may have larger cylinders and combustion chambers that have centers spaced further apart laterally.

Actuator shaft 102 extends from actuator gear train 100 along lateral axis A, and is mechanically coupled to each of throttle valves 94*a* and 94*b* via a pair of fasteners 95, as depicted. Actuator shaft 102 may comprise a single shaft, or multiple mechanically-joined shafts. Portions of actuator shaft 102 may be flat, as depicted, to conform to flat outer surfaces of throttle valves 94.

Throttle-valve actuator 96, including actuator motor 98, is in electrical communication with, and controlled by, the snowmobile ECU, as will be described further below with respect to FIG. 7. Actuator motor 98 is an electric actuator motor powered by an electrical power system of snowmobile 10, controlled by the ECU, and is coupled to actuator gear train 100. Movement of actuator motor 98 is translated through actuator gear train 100, causing actuator shaft 102 to rotate about axis A in a clockwise or counter-clockwise direction. Rotation of actuator shaft 102 in turn causes throttle valves 94*a* and 94*b* to move between a closed throttle position and an open throttle position. In an embodiment, each of throttle valves 94*a* and 94*b* are rotatable in a range of 0 (closed throttle position as depicted) to 90°, fully open throttle position. In other embodiments, each of throttle valves 94*a* and 94*b* are rotatable through a larger range, which may be from fully-closed to fully-open.

Figure 6A:
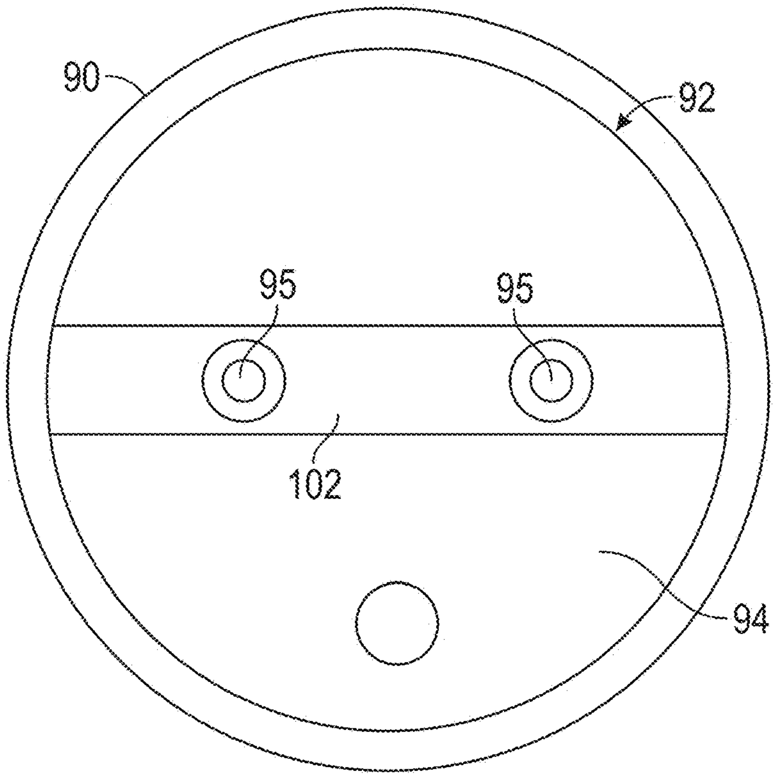
FIG. 6A is a schematic diagram of a throttle valve in a closed position, according to an embodiment of the disclosure.
Figure 6B:
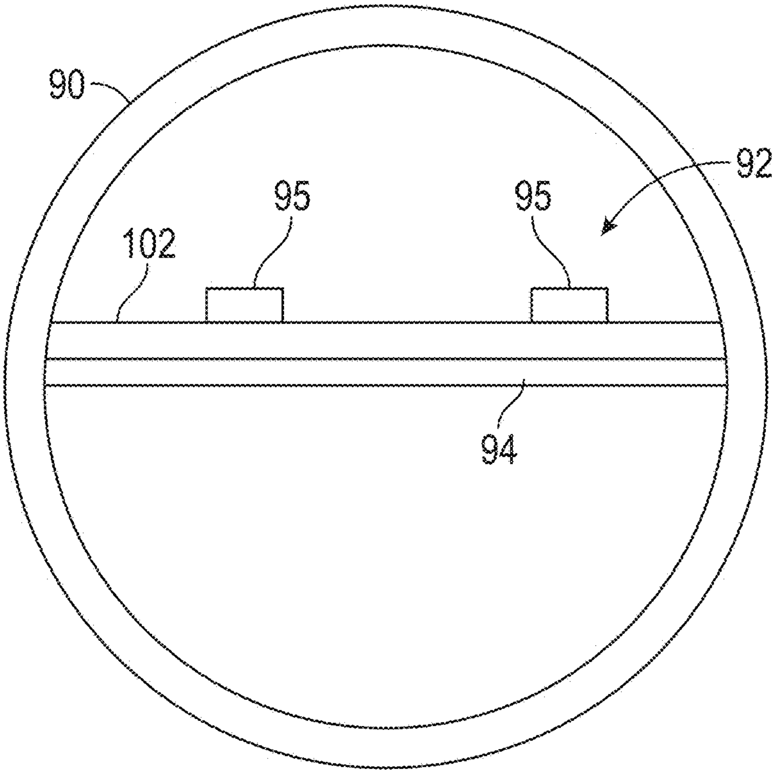
FIG. 6B is a schematic diagram of a throttle valve in an open position, according to an embodiment of the disclosure.

Referring also to FIGS. 6A and 6B, schematic illustrations of a throttle valve 94 in a closed throttle position and the throttle valve 94 in an open throttle position are respectively depicted. Referring specifically to FIG. 6A, a portion of throttle body 90 defining a throttle bore 92 with throttle valve 94 in a closed position is depicted. Throttle bore 92 and throttle valve 94 are representative of any or both of bores 92*a*, 92*b* and valves 94*a*, 94*b*. Fasteners 95 connect throttle valve 94 to actuator shaft 102. Actuator 102 is in a rotational position that causes throttle valve 94 to be in a closed throttle position. In this "closed" throttle position, throttle valve 94 is at a 0° rotational position relative to axis A, which also corresponds to a 0% open throttle position, i.e., not open or closed position. This closed throttle position also corresponds to a minimum valve effective area or minimum throttle-demand effective flow area, meaning that the open area of the valve in the bore is minimized.

Referring specifically to FIG. 6B, the same portion of throttle body 90 defining throttle bore 92 with throttle valve 94 therein is depicted. In this position, shaft 102 and connected throttle valve 94 are rotated into a fully open throttle position. In this "open" throttle position, throttle valve 94 is at a 90° rotational position relative to axis A, which also corresponds to a 100% open throttle position. This open throttle position also corresponds to a maximum valve effective area or maximum throttle-demand effective flow area, meaning that the open area of the valve in the bore is maximized.

In an embodiment, throttle valve 94 is rotatable between the fully-closed throttle position (minimum throttle-demand effective flow area) and the fully-open throttle position (maximum throttle-demand effective flow area), and a plurality of positions between the closed throttle position and the open throttle position, by throttle-valve actuator 96, as controlled by ECU 128 (FIG. 7), using actuator motor 98, actuator gear train 100 and actuator shaft 102. In an embodiment, each throttle valve 94 may be positioned to a number of predetermined discrete throttle positions between the closed and open throttle positions. Such throttle positions may be described in terms of throttle-demand effective flow area, e.g., a flow area measured in $mm^2$, percentage of maximum throttle-demand effective flow area, e.g., 0% of maximum throttle-demand effective flow area to 100% of throttle-demand effective flow area, angular rotation of throttle valve 94 about axis A in degrees. e.g., 0° up to 360° or 0° up to 90°, angular rotation of throttle valve 94 about axis A as a percentage. e.g., 0% (minimum flow) to 100% (maximum flow). Embodiments may also include assigning a numerical value or level to various throttle positions, with a smallest number corresponding to a closed or minimum throttle-valve demand effective area, such as "level 1" and a largest number corresponding to a fully open or maximum throttle-valve demand effective area, such as "level 100", such that a range of minimum to maximum throttle-demand effective flow area ranges from level 1 to level 100, with incremental positions therebetween, e.g. 1, 2, 3, 4 . . . 100.

Figure 7:
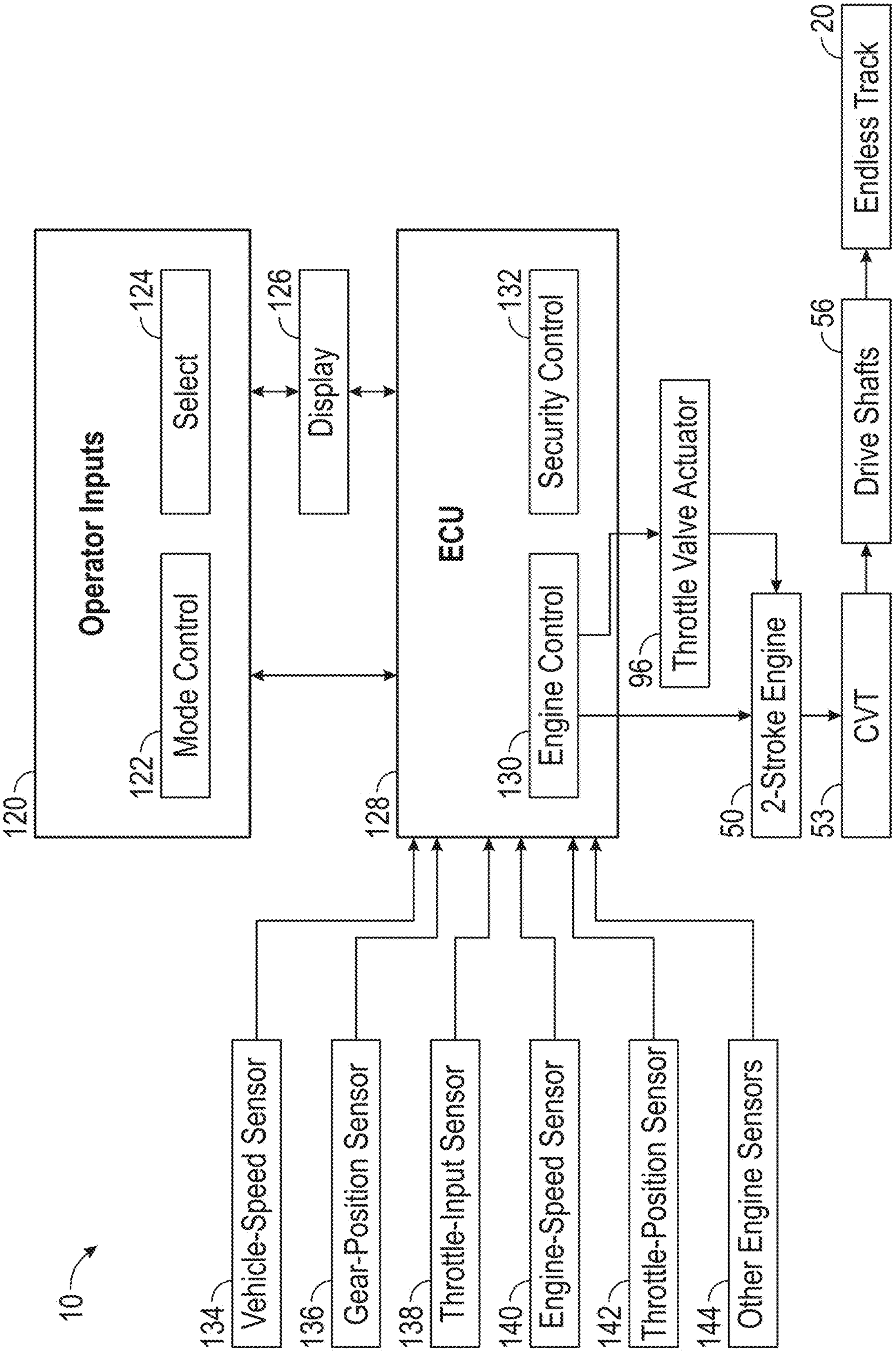
FIG. 7 is a block diagram of a snowmobile system having a 2-stroke internal-combustion engine with electronic throttle control, according to an embodiment of the present disclosure.

Referring to FIG. 7, a block diagram of snowmobile 10 is depicted. In this embodiment, snowmobile 10 includes operator inputs 120 with mode-control input device 122 and select input device 124; display 126; electronic control unit (ECU) 128 with engine control system 130 and security control system 132; sensors that may include vehicle-speed (ground-speed) sensor 134, gear-position sensor 136, throttle-input sensor 138, engine-speed sensor 140, throttle-position sensor 142 and other engine sensors 144; throttle-valve actuator 96; 2-stroke engine 50; transmission 53, which may be a continuous variable transmission or CVT 53 as described above; one or more drive shafts 56; and endless track 20.

Operator inputs 120 include various devices and means for an operator of snowmobile 10 to control and interface with snowmobile 10 and ECU 128. Operator inputs 120 may include a device for selecting an operating mode of snowmobile 10 and its 2-stroke engine 50, i.e., mode control 122, such as an electrical or mechanical switch, or a graphical button on a display device, such as display 126. Operator inputs 120 may also include select input device 124 for selecting displayed operational settings or options. Other operator inputs 120 associated with a gauge of snowmobile may be included. In one such embodiments, and as discussed further below, an operator may interface with the gauge to enter a maximum speed limit, or other information intended to limit a ground speed, engine speed, or other vehicle operation limit.

Operator inputs 120 may collectively comprise a human-machine interface and may include display device 126. Display 126 may be configured to display various information to an operator of snowmobile 10, such as ground speed, engine speed, which may be measured in revolution per minute (RPM), engine temperature, outside temperature, and so on. In an embodiment, display 126 may comprise a touchscreen display configured to receive input from the operator, as well as being configured to display information to the operator.

Electronic control unit (ECU) 128 functions as a vehicle controller and though depicted as a single ECU, may in some embodiments comprise one or more ECUs having processors and memory for controlling electrical systems or subsystems of snowmobile 10. Additional controllers or ECUs not depicted may also be present, such as those specific to control operating systems, including engine 50 and security-related devices, and/or other connected devices. Functions of ECU 128 may be performed by hardware and/or computer instructions saved on memory devices, such as non-transient, computer-readable storage mediums.

Memory devices, in an embodiment, includes computer-readable media in the form of volatile and/or nonvolatile memory and may be removable and/or non-removable. Embodiments include random access memory (RAM), read only memory (ROM), electronically erasable programmable read only memory (EE-PROM), flash memory, optical or magnetic storage devices, and/or other medium that can be used to store information and can be accessed by electronic devices. Memory devices are configured to store various types of vehicle data and executable computer-program instructions.

ECU 128 is in electrical communication with operator inputs 120 and display 126, receiving input from the operator of snowmobile 10 and displaying or otherwise communication information to the operator.

ECU 128 may include a controller or control system 130 to directed to controlling 2-stroke engine 50, and a controller or control subsystem 132 directed to controlling security devices and systems. ECU 128 with its engine control 130 is configured to control various operations of 2-stroke engine 50, including electronic throttle-valve actuator 96, as described above, and as described further below with respect to FIGS. 8-16.

The various sensors, including sensors 134-144 are in electrical communication with ECU 128. Vehicle-speed sensor 134 detects and indicates a ground speed of snowmobile 10. Gear-position sensor 136 detects and indicates a gear position of snowmobile 10. In an embodiment, gear-position sensor 136 indicates whether snowmobile 10 is in a low gear. Throttle-input sensor 138 detects and indicates a position of user-actuated throttle input device 80. The position of throttle input device 80 generally indicates a throttle input that is requested by the operator. In an embodiment, throttle-input sensor 138 is located at or near throttle-input device 80. Sensor 138 detects the requested throttle position and communicates that to ECU 128. Engine-speed sensor 140 detects and indicates an engine speed, which may be measured in RPMs. Throttle-position sensor 142 detects and indicates an actual position of one or both of throttle valves 94. In an embodiment, throttle-position sensor 142 may be located at or near throttle-valve actuator 96. Other engine sensors 144 may also be present and in communication with ECU 128. Other engine sensors 144 may include one or more fault sensors, engine-temperature sensor, exhaust-temperature sensor, an outside-air temperature sensor, barometric-pressure sensor, fuel-pressure sensor, low-fuel sensor, ECU-voltage sensor, brake sensor, e.g., to detect whether brakes are engaged, and other such sensors.

Snowmobile 10 may also include a CANBUS or other vehicle network connecting the various controllers and electrical devices of snowmobile 10.

As also described above with respect to FIGS. 1-3, 2-stroke engine 50, drives CVT 53, which in turn powers drive shafts 56, which turn endless track 20, thereby propelling snowmobile 10.

Figure 8:
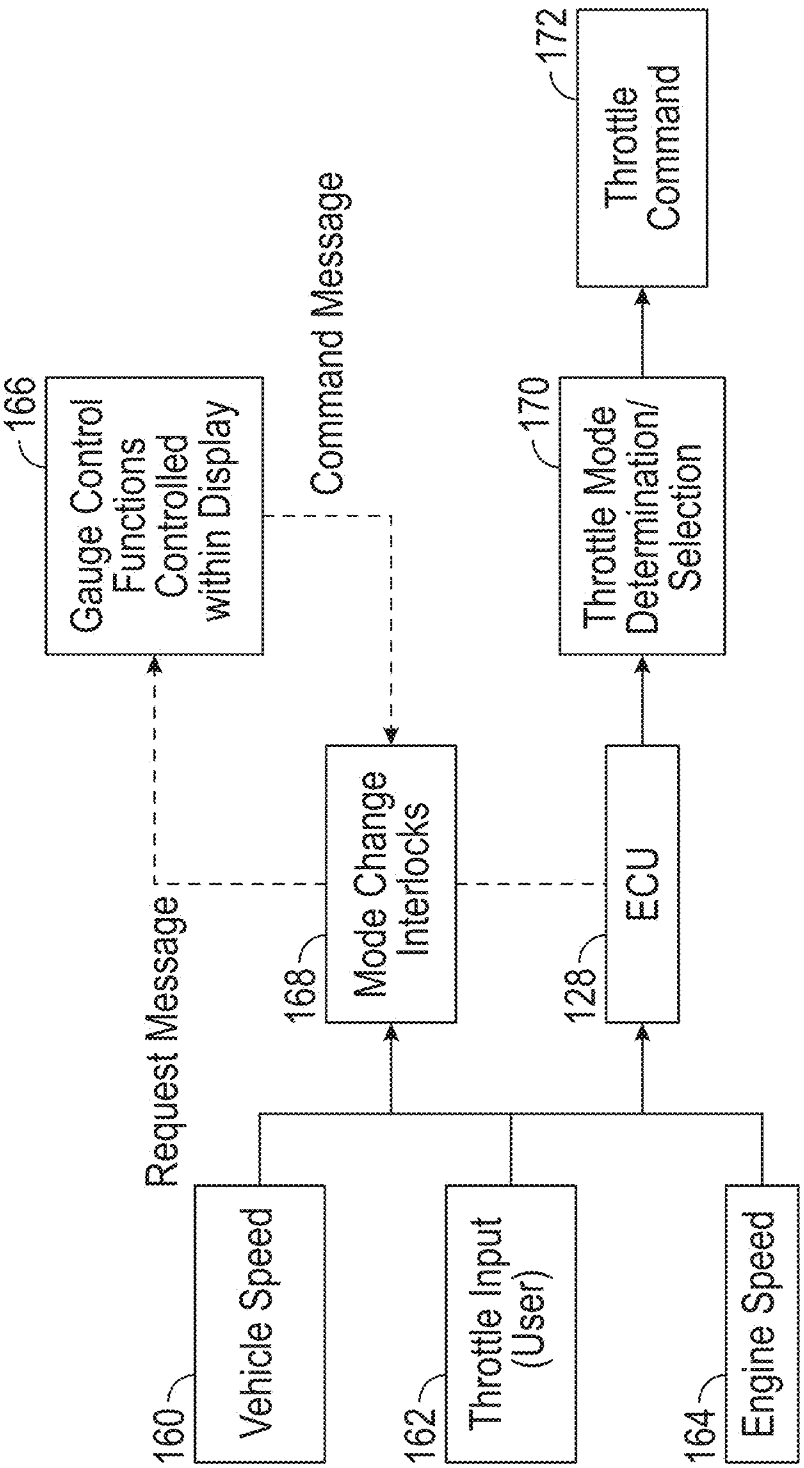
FIG. 8 is a control diagram of an electronic throttle-control system, according to an embodiment of the present disclosure.

Referring to FIG. 8, an embodiment of a control diagram for controlling and determining a throttle demand or throttle position for snowmobile 10 is depicted. Generally, in operation, ECU 128 receives inputs from snowmobile 10 sensors and the operator/user of snowmobile 10, determines a throttle mode, dynamically determines an appropriate throttle positions, then issues throttle commands to the throttle-valve actuator to attain that determined throttle position, thereby controlling flow of air and fuel to 2-stroke engine 50.

More specifically, in this embodiment, ECU 128 receives vehicle speed input 160, operator throttle input, 162 and engine speed 164 from vehicle-speed sensor 134, throttle-input sensor 138 and engine-speed sensor 140, respectively. "Input" may comprise electrical signals or data transmitted from the respective sensors or associated sensors and controllers. The operator of snowmobile 10 interfaces with operator inputs 120 (see also FIG. 7), which includes gauge 166, requesting a particular throttle mode, causing a mode-command message to be sent to ECU 128.

In an embodiment, mode-change interlocks 168 prevent a throttle mode from being changed during operation, or when certain engine and/or vehicle criteria are not met. Such criteria may include, but not be limited to, being below a predetermined threshold vehicle speed or engine speed, being at or below a predetermined throttle position, and other criteria. Mode-change interlocks 168 may comprise one or more software algorithms stored in memory associated with ECU 128, and executed by a processor of ECU 128.

In an embodiment, ECU 128 may transmit information, a "request message" to gauge 166 and/or display 126 (FIG. 7) relating to a requested throttle mode. Such information may advise an operator of a requested throttle mode, a current throttle mode, or of an inability to implement a requested throttle mode due to an interlock condition.

In this control embodiment, based on vehicle and engine speed, throttle input and user selection, ECU 128 determines or confirms a throttle mode. As described briefly above, a "throttle mode" corresponds to a selectable, predetermined throttle-control translation map. A throttle-control translation map "translates" or correlates an operator-requested throttle input, such as throttle-input 162, to a throttle output, or throttle position as determined by ECU 128. Generally, for any particular throttle input, the throttle map identifies an associated throttle output corresponding to throttle valve positioning. Such a throttle output might be the same as the requested throttle input in a first throttle mode, might be less than a requested throttle input in a throttle-limiting mode, or may be greater than a requested throttle input in a third throttle mode. Such throttle modes might respectively be labeled or identified by various labels, such as a standard throttle mode, limited throttle mode, and a dynamic or race throttle mode. Throttle-control translation maps are discussed in greater detail below with respect to FIG. 12.

After determining or selecting the throttle-control mode at step 170, ECU 128 then issues throttle commands 172 to control throttle-control actuator 96 and a position of throttle valves 94 according to the selected throttle-control mode and associated throttle-control translation map. In this particular embodiment, no throttle position sensing input or output filtering occurs. A lack of filtering on input/output signals allows for faster response without latency. In an alternate embodiment that employs limited or reduced filtering, the number of filtering samples is less than 10 samples. In one embodiment, ECU 128 utilizes a PID loop of less than 1 kHz with a greater than 1 kHz calculation loop. In one such embodiment, ECU 128 utilizes a 500 Hz PID loop with 2 kHz calculation loop to continuously determine throttle commands 172. Such embodiments reduce latency and improve throttle response, such that the throttle response of ETC system 88 resembles that of a mechanically-operated throttle.

Figure 9:
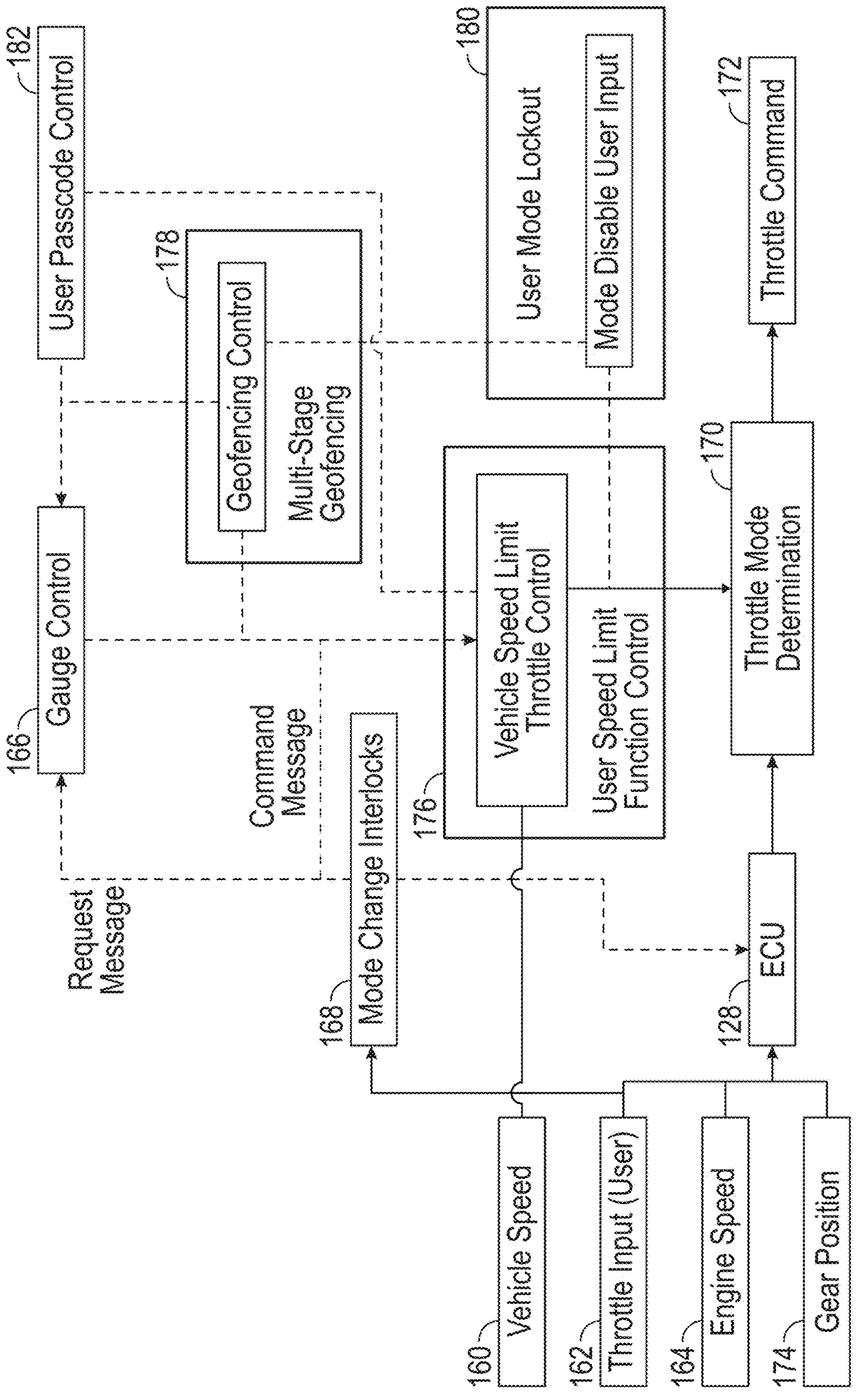
FIG. 9 is a control diagram of an electronic throttle-control system, according to another embodiment of the present disclosure.

Referring to FIG. 9, another embodiment of a control diagram for controlling and determining a throttle output for 2-stroke snowmobile 10 is depicted. This embodiment is similar to the embodiment depicted in FIG. 8, though in the embodiment of FIG. 9, additional security and performance-limiting features are included.

As depicted, in this embodiment, ECU 128 receives vehicle speed input 160, throttle input 162 and engine speed input 164 from vehicle-speed sensor 134, throttle-input sensor 138 and engine-speed sensor 140, respectively. In this embodiment, ECU 128 also receives gear-position input 174 from gear-position sensor 136, indicating whether snowmobile 10 is in a low-gear position. As such, ECU 128 also takes into account a gear ratio of snowmobile 10, and adjusts throttle output and throttle valve 94 positions accordingly. In other embodiments, ECU 128 may also receive data and input from other vehicle and engine sensors when determining an appropriate throttle output or throttle position.

Similar to the operation described in FIG. 8, ECU 128 receives user input from gauge 166 or operator inputs 120, and prevents mode changes via interlocks at step 168, makes a throttle mode determination at step 170, and outputs necessary throttle commands at step 172. However, in this embodiment, ECU 128, as part of the electronic throttle-control system, determines throttle modes and specific throttle commands, at least in part, based on additional system controls.

More specifically, in this embodiment of a control method and system, such system controls include vehicle speed-limit throttle control 176, geofencing control 178, user-mode lockout 180 and user passcode control 182. Such controls may be used to limit performance and speed of snowmobile 10, including limiting access to high-performance throttle modes, provide passcode protection for inexperienced operators, and limit geographical use via geofencing.

Control of speed-limits may be implement with vehicle speed-limit throttle control 176. In an embodiment, an operator, which may be a parent or adult, for example, may interact with operator inputs 120 to enter a desired speed-limit control, which may be a maximum speed limit. ECU 128 with speed-limit throttle control 176 saves the selected speed limit input in a memory, monitors snowmobile 10 ground speed with vehicle-speed sensor 134, and electronically limits a position of throttle valves 94 to maintain a speed at or below the selected speed.

In an embodiment, to implement a vehicle speed limit as described above, a passcode is required, as indicated by user passcode control 182. In one such embodiment, a passcode must be entered by an operator via operator inputs 120 or gauge control 166, before limitation on vehicle speed may be entered, and/or before a speed limitation may be removed. As such, a parent, owner or other responsible person may use the passcode to ensure snowmobile 10 with a potentially inexperienced operator, or any other operator, does not exceed the selected speed limit.

User mode lockout control 180 allows an operator to define a user profile, which may include the functionality of enabling or disabling one or more available throttle-control modes. For example, a performance-limited youth user mode may be defined, and a performance-enhanced or race-oriented mode may be disabled by an operator interacting with user inputs 120. In an embodiment, ECU 128 causes throttle-control modes to be displayed at gauge 166 or display 126, such that the operator may view and select those throttle-control modes to be enabled or disabled for a particular user or operator profile. In an embodiment, the operator may be required to input a passcode to make changes to change user or throttle modes.

Geofencing control 178 may be included to create a virtual geographic fence or boundary, within which, operation of all or some functions of snowmobile 10 is available to an operator. However, outside the virtual boundary, operation is restricted. In one such embodiment, geofence boundaries may be entered via operator inputs 120, defining an area in which an inexperienced or youthful operator may operate snowmobile 10. Outside the defined boundaries, however, operation of snowmobile 10 may be restricted to low speed limits, to particular modes, or to even cease operation.

Embodiments of speed-limit throttle control 176, geofencing control 178, user-mode lockout 180 and user passcode control 182 may comprise dedicated hardware components and one or more software algorithms stored in memory associated with ECU 128, and executed by a processor of ECU 128, or a processor in communication with ECU 128.

Figure 10:
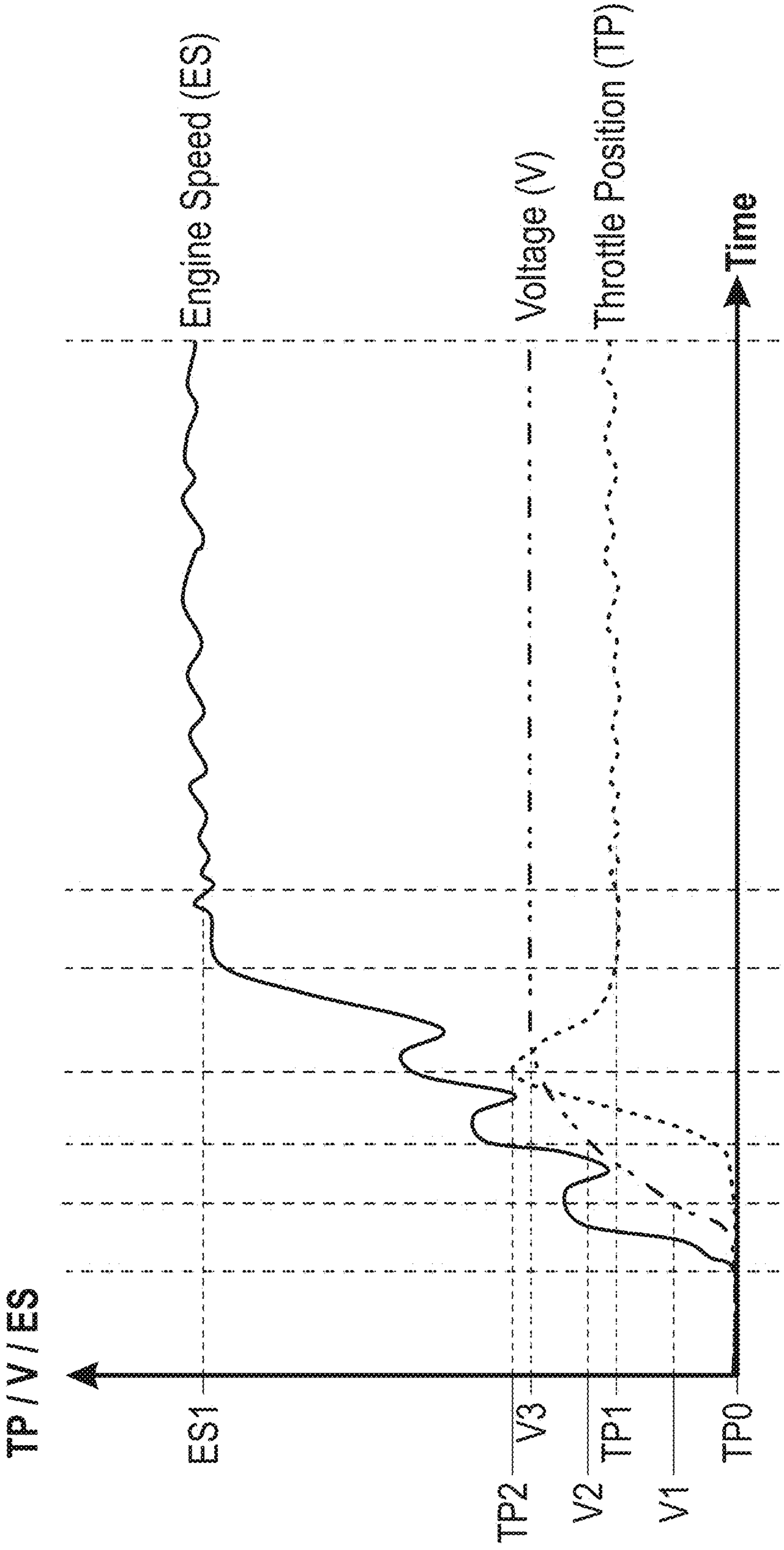
FIG. 10 is a chart depicting an engine-starting sequence of a snowmobile having a 2-stroke internal-combustion engine with electronic throttle control, according to an embodiment of the present disclosure.
Figure 11:
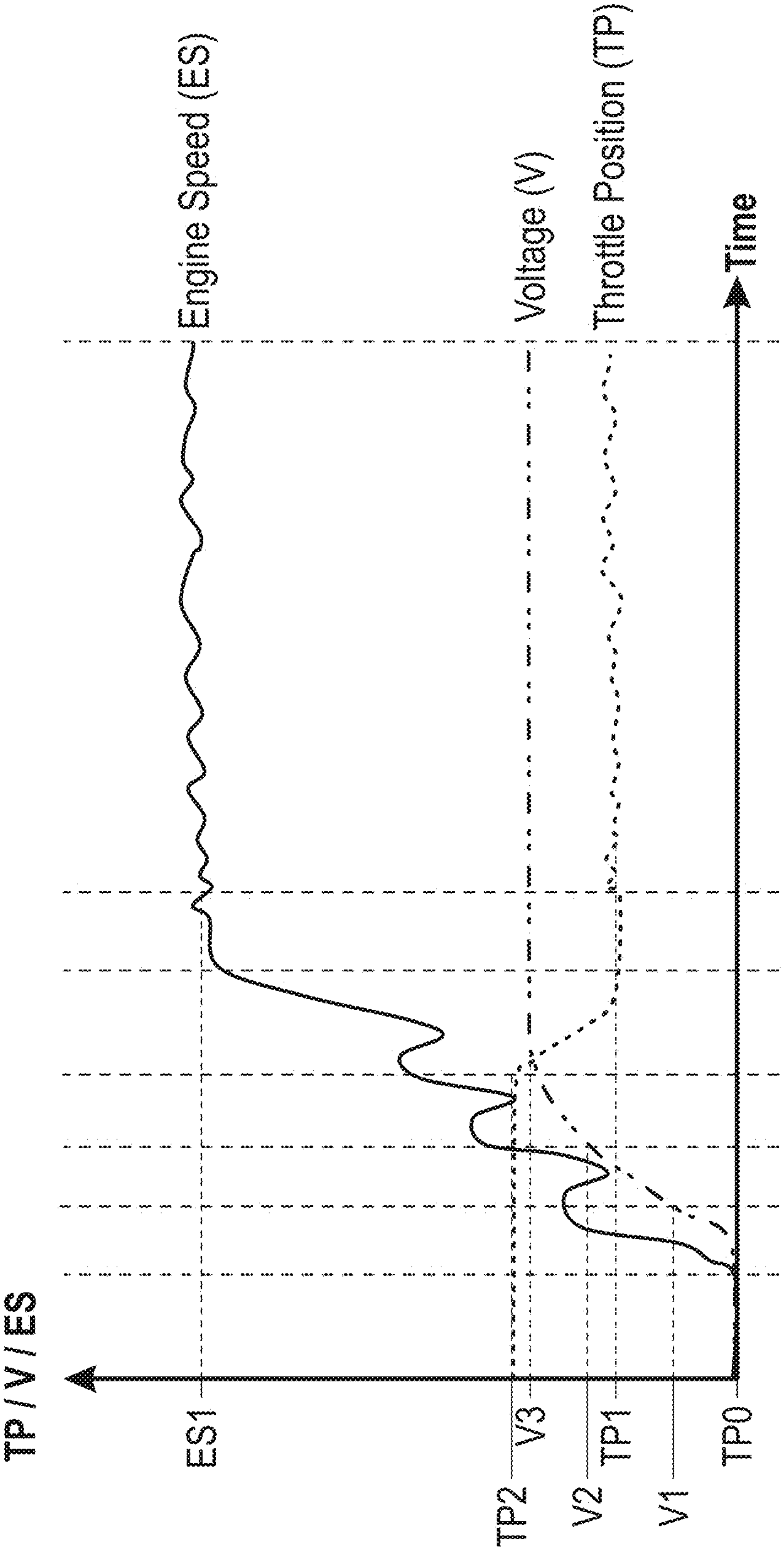
FIG. 11 is a chart depicting an engine-starting sequence of a snowmobile having a 2-stroke internal-combustion engine with electronic throttle control, according to another embodiment of the present disclosure.

Referring to FIGS. 10 and 11, embodiments of a low-flow start-and-idle throttle control process, and a high-flow start-and-idle throttle-control process for a 2-stroke snowmobile 10, are respectively depicted.

Referring specifically to the graph of FIG. 10, the x axis or abscissa indicates time and the y axis or ordinate indicates three quantities: engine speed ES (solid line), voltage V (long-short dashed line) and throttle position TP (dashed line).

Engine speed ES may be measured in RPMs, as detected by engine-speed sensor 140 and communicated to ECU 128.

Voltage V is a voltage generated by an electrical system of snowmobile 10, and specifically from a power-generating device of the electrical system, such as a magneto or alternator. In an embodiment, snowmobile 10 does not include a battery or electric motor starter, but rather, includes a pull cord or rope operable to rotate engine 50 crankshaft and magneto (or other electrical-generating component). Pulling the cord rotates the crankshaft and magneto, generating power, which may be measured in generated voltage V. In some embodiments, 2-stroke snowmobile 10 may include a battery powering a starter motor, which in turn rotates the crankshaft and magneto, thereby generating voltage V.

Throttle position TP corresponds to a position of throttle valves 94, ranging from a closed or minimum-air flow position to a fully-open or maximum air-flow position, and positions therebetween. Throttle position TP may be indicated or measured as a percentage of a fully-open position, such as a 0% open position to a 100% open position.

At time T0, 2-stroke engine 50 is not yet started or operating; throttle position TP is closed, i.e., throttle valves 94 are in a fully-closed or minimal air-flow position, or at a 0% open position; engine speed ES is zero; and voltage V is zero.

Generally, throttle position TP is determined and controlled by electronic throttle-control system 88, including ECU 128. However, until ECU 128 and system 88 is sufficiently powered, throttle position TP is not actively controlled. In this low-flow start embodiment, throttle position TP is initially closed, pending actuation by throttle-valve actuator 96 as controlled by ECU 128.

At time T1, an operator initiates an engine-start sequence, such as by pulling a start cord or depressing a start button causing a battery to power a starter motor of snowmobile 50. Initiating the engine-start sequence causes pistons, crankshaft, magneto or alternator, of 2-stroke, internal-combustion engine 50 to rotate. As such, engine speed ES begins to increase at time T1.

At time T2, rotation of engine 50 generates sufficient power such that voltage V rises above 0 volts to a threshold voltage V1. In an embodiment, voltage V2 at time T3 is sufficient to turn on an H-bridge electronic circuit of the electrical-generation system of snowmobile 10, such that throttle-valve actuator 96 is sufficiently powered to begin opening throttle valves 94.

After time T2, and as time approaches T3, engine 50 rotation continues as a result of initiation of the engine start sequence. Voltage V rises above V1, while engine speed ES also continues to increase.

At time T3, the generated power and corresponding voltage is sufficient to allow normal electrical operations, such that ECU 128 commands throttle position TP to increase rapidly through TP1 up to TP2 at time T4.

At time T4, voltage V is near a maximum voltage V3 as engines speed increases. Throttle position TP is at TP2, which is above a necessary air flow for engine idle. Electronic throttle-control system 88 with ECU 128 initiates an idle control sequence to change throttle position TP to a position appropriate for engine idle. As such, electronic throttle-control system 88 with ECU 128 processes engine sensor inputs, such as those described above, and begins to close throttle valves 94. i.e., changes the throttle position to approach TP1 in the time interval of T4 to T5. Initially increasing throttle position TP to TP2 to allow for relatively high air flow, followed by reducing air flow at TP1, allows the engine speed to rise above idle speed and then settle to the target so that it can more effectively burn the fuel used for the starting event to reduce smoke, improve idle consistency and minimize spark plug fouling.

At time T5, engine speed ES is at a predetermined idle speed, which in an embodiment may be in a range of 1,000 RPM to 1.500 RPM. Voltage V is in a steady state at V3. From time T5 to T6, electronic throttle-control system 88 with ECU 128 holds throttle position TP at idle position TP1.

At time T6, electronic throttle-control system 88 with ECU 128 initializes an "idle" proportional-integral-derivative (PID) control loop, which is then actively executed starting at time T6 and extending thereafter to time T7 and beyond, and until an operator or ECU 128 calls for operation above engine idle.

Consequently. FIG. 10 depicts a low-flow start-up sequence for snowmobile 10 with a 2-stroke internal-combustion engine that includes the steps of: ECU 128 commanding a throttle position of throttle valve 94 at a first, low-flow or minimal flow position; causing rotation of an electricity-generating device of the 2-stroke engine 50, such as rotation of a magneto or rotor of an alternator; generating a voltage produced by rotation of the electricity-generating device; when the generated voltage exceeds a predetermined voltage threshold, commanding opening throttle valve 94 to a throttle position that is greater than a throttle idle position, such that an effective area of throttle valve 94 is greater than an effective area when in the minimal flow position, and such that air flow through throttle valve 94 is increased and greater than air flow needed for an engine idle state; closing throttle valve 94 to decrease an effective valve area and corresponding air flow, to an idle-state effective valve area and air flow; controlling a throttle valve 94 position to maintain a predetermined engine idle speed.

Referring to FIG. 11, a high-flow start-up sequence for snowmobile 10 with a 2-stroke internal-combustion engine is depicted. The start-up sequence of FIG. 11 is similar to the start-up sequence of FIG. 10, though the initial throttle positions are markedly different. In the embodiment of FIG. 10, at start up, the one or more throttle valves 94 are initially at a minimal air flow or minimal valve effective-area position TP0, followed by throttle valves 94 being ramped up or opened to a high-flow position, TP2, followed by closing valves 94 to an idle position. In contrast, in the embodiment of FIG. 11, throttle valve position TP is initially at a relatively high-flow, or large valve-effective-area position TP2.

In an embodiment, throttle valves 94 may be held in throttle position TP2 by a biasing spring, then held in that position until time T4 when voltage V has surpassed threshold voltage V1, and initialization of the PID idle loop is initiated. At time T4, electronic throttle-valve control system 88 with ECU 128 commands actuation of throttle valves 94, which counters the spring bias, and actuates throttle valves 94 to an idle throttle position TP1, which is then maintained.

Figure 12:
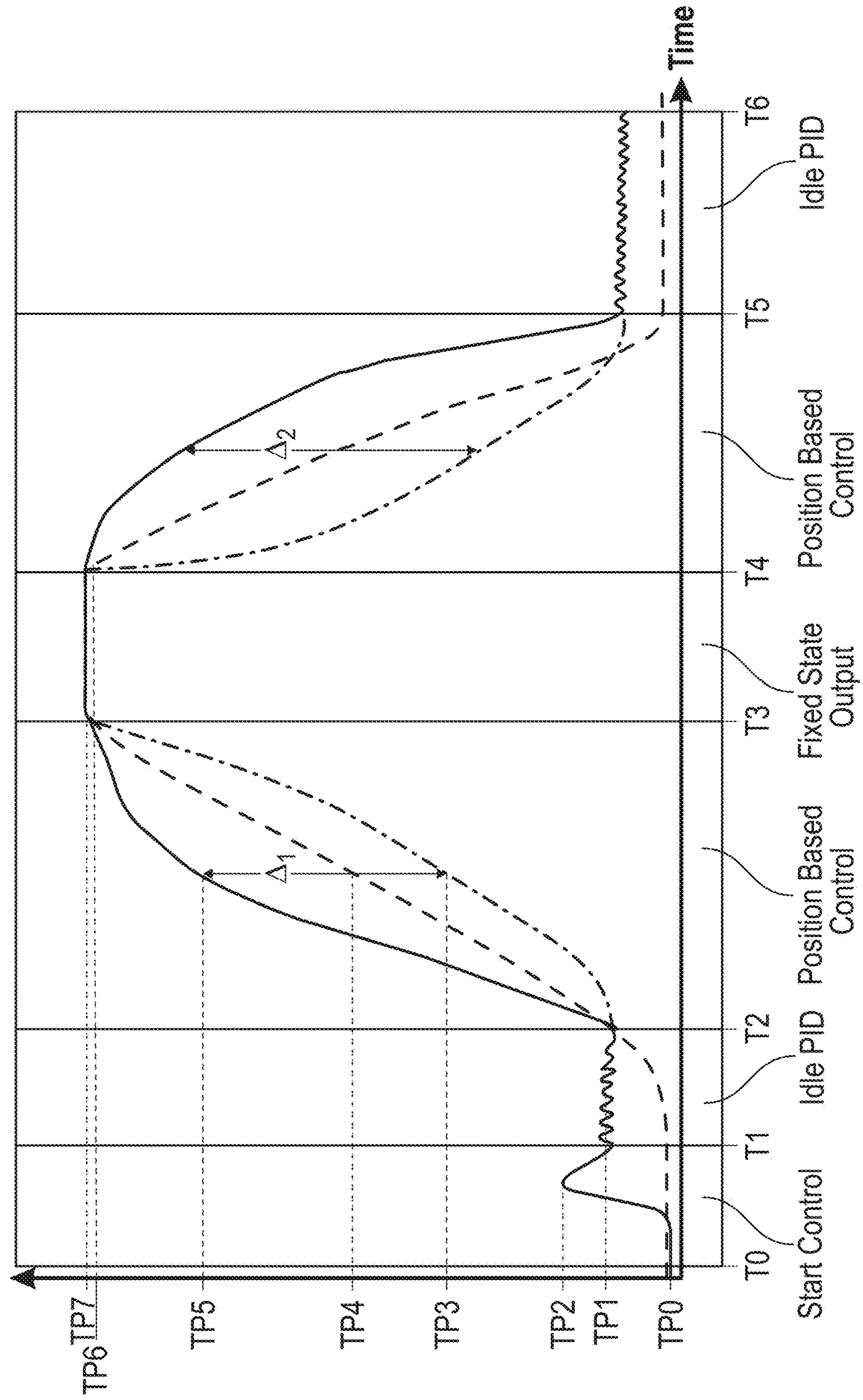
FIG. 12 is a chart depicting throttle input and throttle output vs. time for a 2-stroke snowmobile, according to an embodiment of the present disclosure.

Referring to FIG. 12, a chart depicting throttle input and throttle output (throttle position) vs. time is depicted. Time is represented on the x axis, or abscissa, and ranges from time T0 to T6, while throttle input and throttle output are represented by the y axis or abscissa, ranging from TP0 to TP7, which corresponds to 0% throttle output (minimum air flow and maximum open position of throttle valves 94) to 100% throttle output (minimum air flow and maximum open position of throttle valves 94).

The time period of T0 to T1 represents a star-up time period; time period T1 to T2 represents a first engine-idle state or control period; time period T2 to T3 represents a first position-based throttle control period, where an operator selects or inputs a throttle position and a throttle output or actual throttle position is determined by electronic throttle-control system 88 and ECU 128; time period T3 to T4 represents a fixed-state output; time period T4 to T5 represents a second position-based throttle control period; and time period T5 to T6 represents a second engine-idle control period.

The dashed line indicates throttle input, corresponding generally to an amount of throttle requested by an operator of snowmobile 10 operating throttle-input device 80. In an embodiment, throttle input corresponds to a selected position of throttle-input device 80, which also corresponds to a detected mechanical position of throttle-input device 80 as sensed or detected by throttle-input sensor 138. In one such embodiment, throttle input may range from a minimum input of zero, to a maximum requested throttle input of 100%. In an embodiment, and as depicted in FIG. 12, throttle input ranges from a throttle neutral position TP0, or 0% throttle input, to a maximum throttle input of TP7, or 100% throttle. The dashed-line throttle input set may also correspond to a first set of throttle outputs, such that a 1:1 relationship exists between throttle input and throttle output for time periods T2 and beyond (after start up). For example, a throttle input of 50% of maximum may correspond to a throttle output of 50% of maximum throttle, or 100% throttle input corresponds to 100% throttle output.

The solid line and the long-dash-short-dash line depicted in FIG. 12 each correspond to a range of actual throttle positions TP. As described with respect to FIGS. 10-11, each throttle position TP corresponds to, or represents, a particular throttle valve 94 position as determined by electronic throttle-control system 88. The various throttle positions TP may also be referred to as a "throttle output" as each throttle position is a result of a requested throttle input. Consequently, the chart of FIG. 12 refers to "throttle inputs" and "throttle outputs."

The solid line represents a second set of throttle positions TP corresponding to a race throttle mode and a second throttle-control translation map, while the long-dash-short-dash line represents a third set of throttle positions TP corresponding to a limited throttle mode and a third throttle-control translation map. The second and third sets of throttle positions TP are determined, at least in part, by the throttle input. Generally, for the second set of throttle positions TP corresponding to a race throttle mode, each throttle position TP is equal to, or greater than a corresponding throttle input, and for the third set of throttle positions TP corresponding to the limited throttle mode, each throttle position TP is equal to, or less than, a corresponding throttle input.

In operation, and as will be described further below, ECU 128 receives throttle input in the form of data or a signal from throttle-input sensor 138, based on operator interaction with throttle-input device 80. ECU 128 then translates the received throttle input to a throttle body command through one of a plurality of throttle-control translation maps that are used to alter the performance characteristics of engine 50. In an embodiment, the plurality of translation maps are used to alter the feel of snowmobile 10 by controlling engine air flow through throttle valves 94 and/or controlling a rate at which throttle is applied relative to the operator's input. For example, a reduced maximum throttle opening with a slower ramp between input and output command can serve as an operational mode for entry level or experienced riders, such as the "limited" throttle mode depicted by the long-dash-short-dash line of FIG. 12. A 1:1 translation between input and output can serve as an operational mode for more experienced riders (dashed line). Furthermore, a map in which the throttle opens further than the operator commands via throttle-input device 80 at certain operating conditions can be used for racing or mountain applications to enhance throttle response, i.e., the "race" throttle mode corresponding to the solid line set of throttle positions TP of FIG. 12.

In the embodiment depicted, throttle input during the start-up period of T0 to T1 is relatively constant at TP0. During the first idle state period of time T1 to T2, throttle input is increased to TP1, which is an idle input. In an embodiment, during the start-up period and first idle period, throttle output may be predetermined, with little or no consideration of an actual throttle input so as to initialize operation of snowmobile 10 and engine 50 at start up. More specifically, and in this embodiment, from T0 to T2, all actual throttle positions TP for each available throttle mode may be substantially the same. In the embodiment of FIG. 12, throttle positions TP during start-up from T0 to T1 and during idle from T1 to T2 are the same as the "low-flow" start start-up sequence of FIG. 10 (where time period T0 to T2 of FIG. 12 corresponds to time period T0 to T7 of FIG. 10). In other embodiments, a high-flow start-up control sequence, such as the one depicted and described with respect to FIG. 11 may be utilized.

After engine idle is established, and after time T2, throttle output is determined based on the position of throttle-input device 80 and a corresponding throttle-control translation map, e.g., the map for 1:1 map, or limited mode. As such, throttle output during time period T2 to T3 is referred to as "position-based" throttle control. Between time T2 and time T3, throttle input and throttle position TP corresponding to a 1:1 throttle-control translation map increases from throttle position TP1, to TP6 at time T3.

However, unlike the first set of throttle positions corresponding to selection of the 1:1 throttle map, when an operator selects the second or race map, electronic throttle-control system 88 and ECU 128 controls throttle valves 94 to exceed an operator-requested throttle input. For example, when throttle input is at approximately 50%, which in a 1:1 mapping would correspond to a 50% throttle output at throttle position TP4, the throttle output is approximately 75% at throttle position TP5. In other words, the throttle output at TP5 is 1.5 times the throttle input of TP4, i.e., a 1:1.5 translation. A difference between throttle outputs for throttle input/1:1 map as compared to the race map is measured as $\Delta_1$. In an embodiment, this throttle-output difference $\Delta_1$ may vary with throttle input, such that a non-linear relationship between throttle input and throttle output is defined by the second or race map, as depicted. As will be understood by those of ordinary skill, a relationship between throttle input and throttle output may be defined in many different ways by a throttle-control translational map.

Conversely, when an operator selects the third or limited map, electronic throttle-control system 88 and ECU 128 control throttle valves 94 to be below an operator-requested throttle input. For example, when throttle input is at approximately 50%, which in a 1:1 mapping would correspond to a 50% throttle output at throttle position TP4, the throttle output is approximately 35% at throttle position TP3. In other words, the throttle output at TP3 is 0.7 times the throttle input of TP4, i.e., a 1.33:1 translation. As can be seen by the long-dash-short-dash line corresponding to the third and limited translational map, throttle output is less than throttle input for most requested throttle inputs.

At time T3, throttle input is nearly at a maximum input, and throttle position demand is at TP6 for the given map selection. Shortly after time T3, throttle input is at maximum input, or 100%, and throttle-input device 80 is held by an operator at a mechanical stop. Throttle position TP is controlled by a fixed-duty cycle. From approximately time T3 to time T4, throttle control is no longer position based since the throttle input is at the maximum setting.

Rather, throttle control is now based on predetermined parameters saved in electronic throttle-control system 88, such as maximum throttle position TP7.

At time T4, throttle input is at a maximum and throttle position TP still at TP7. After time T4, throttle input decreases below a maximum throttle input based on operator control of throttle-input device 80, as sensed by throttle-input sensor 138, and as communicated to ECU 128. Consequently, from time T4 to time T5, throttle control is once again position based, i.e., based upon a position of throttle-input device 80.

At time T5, a second idle PID control loop is implemented, with throttle output TP being set to idle throttle output TP1.

Figure 13:
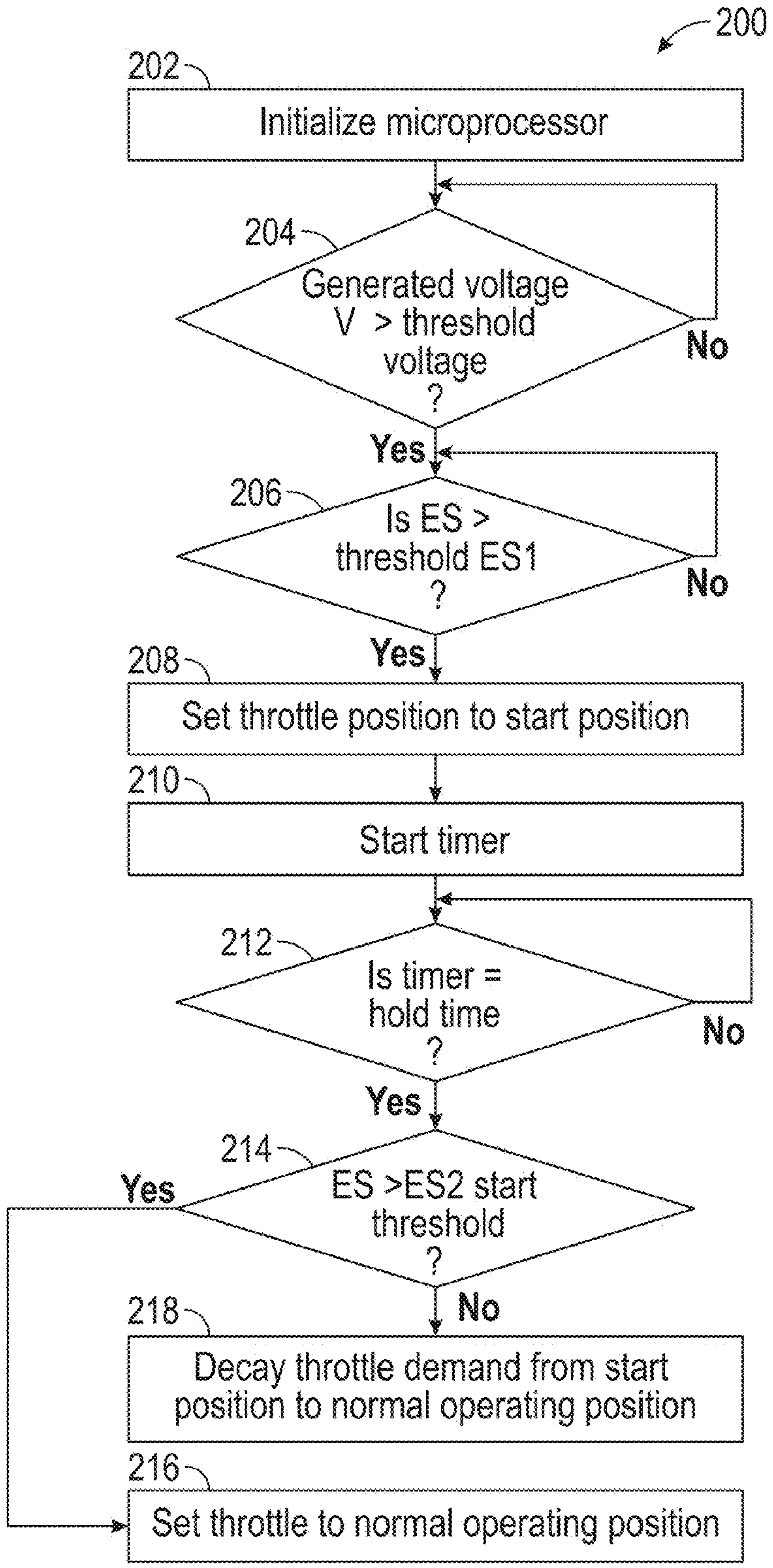
FIG. 13 is a flowchart depicting and describing a method for controlling a throttle for a snowmobile having a 2-stroke internal-combustion engine with electronic throttle control, according to an embodiment of the present disclosure.

Referring to the flow charts of FIGS. 13 and 14, additional detail regarding throttle control is depicted and described.

Referring specifically to the flow chart of FIG. 13, an embodiment of a process 200 for controlling a throttle for a 2-stroke snowmobile engine 50 is depicted and described. At step 202, a processor of ECU 128 is initialized. At step 204, electronic throttle-control system 88 determines whether a voltage V generated by snowmobile 10 at start-up (as described above) is greater than a predetermined threshold voltage. Referring also to FIG. 10, in an embodiment, the predetermined threshold voltage may be voltage V1. If generated voltage V is not above the predetermined threshold voltage, then the process reverts back to step 202.

If generated voltage V is at or above the predetermined threshold voltage, then the power supplied by the stator is sufficiently high to provide the necessary current to throttle valve actuator 96 to ensure position accuracy and no loss of other vehicle function occurs due to voltage drops. Consequently, sufficient power will be available to continue the start-up process, then at step 206, actual engine speed ES, which may be measured in RPMs, is compared to a first predetermined engine-speed threshold, $ES_1$. In an embodiment, engine speed is monitored by ECU 128, which receives input from engine-speed sensor 140 (see FIG. 7). If the actual engine-speed ES is greater than the predetermined engine-speed threshold $ES_1$, then the process proceeds to step 208, and ECU 128 actuates throttle valve actuator 96 to set throttle valves 94 to a predetermined throttle start position TP. Referring also to FIG. 10, in a low-flow start-up control sequence, this predetermined throttle start position refers to throttle position TP0, which in an embodiment may be less than TP1. In a high-flow start up control sequence, such as the one described in FIG. 11, a predetermined throttle start position TP may be greater than throttle position TP1, such as TP2. In an embodiment corresponding to FIG. 10 with a low-flow start, ECU 128 and electronic throttle-control system 88 ramp up or open up throttle position TP from TP0 to TP2, then reduce to TP1 for idle, as engine speed ES increases.

If the engine speed ES is not above the predetermined engine-speed threshold $ES_1$, then monitoring of engine speed ES continues.

After setting throttle position TP to a throttle start position, in an embodiment, electronic throttle-control system 88 initiates a timer hold sequence, such that at step 210 a timer is started. At step 212, if the tinier time is less than a predetermined hold time, then the timer hold sequence continues, then when the timer is equal to the predetermined hold time, at step 214, engine speed ES, which may be measured in RPM, is compared to a second predetermined engine-speed threshold, $ES_2$. In an embodiment, second engine-speed threshold $ES_2$ is greater than first engine-speed threshold $ES_1$.

If engine speed ES is greater than second engine-speed threshold $ES_2$, then at step 216, electronic throttle-control system 88 begins controlling throttle position TP in a "normal" operating mode, which may be a position-based operating mode as described above.

However, if engine speed ES is not greater than second engine-speed threshold $ES_2$, then at step 218, electronic throttle-control system 88 decays or reduces that throttle position TP to close down valves 94 until engine speed ES increases, and electronic throttle-control system 88 begins controlling throttle position TP in a "normal" operating mode, which may be a position-based operating mode as described above.

Figure 14A:
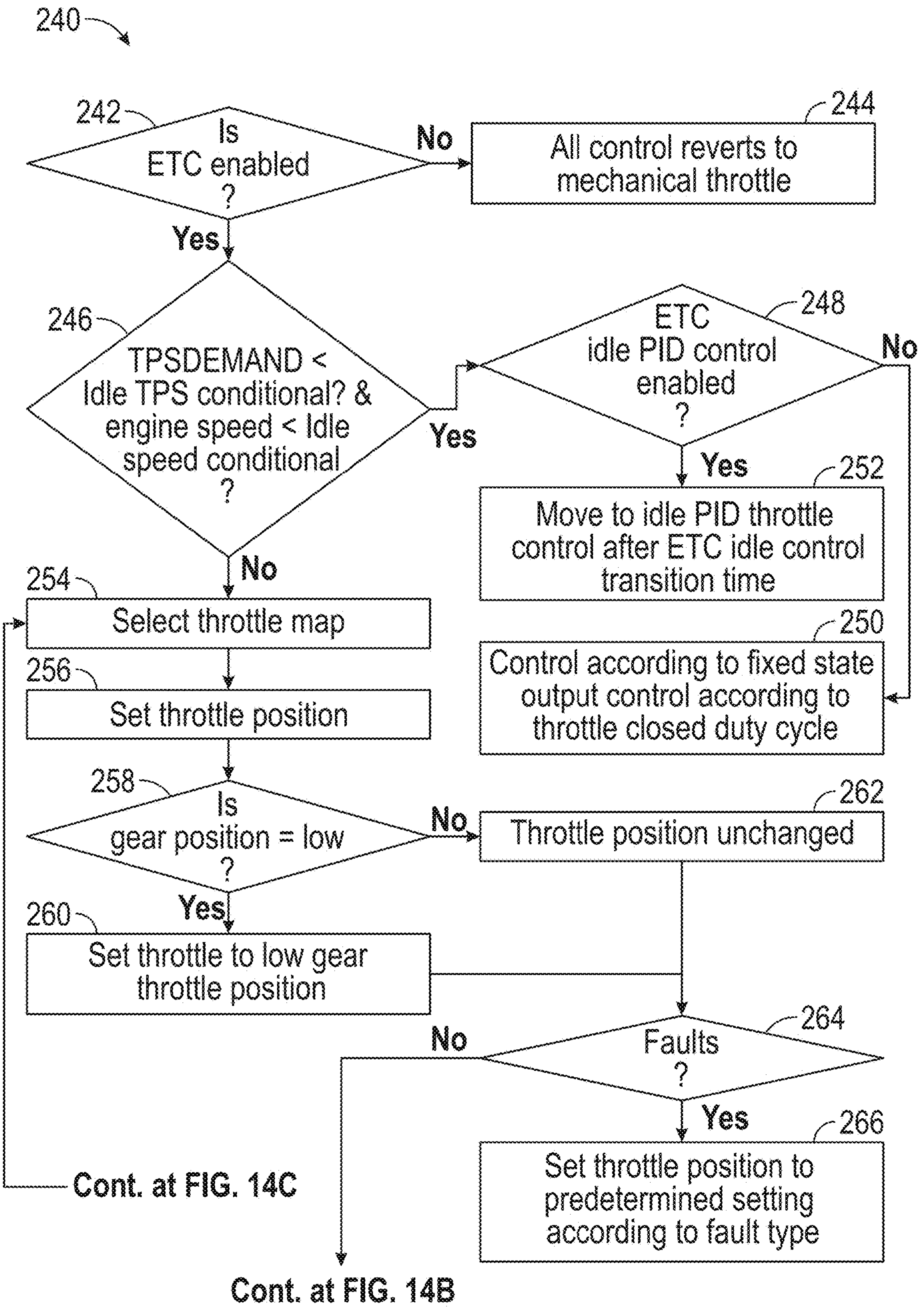
FIGS. 14A-C is a flowchart depicting and describing a method for post-start-up throttle control by an electronic throttle-control system for a snowmobile having a 2-stroke internal-combustion engine with electronic throttle control, according to an embodiment of the present disclosure.
Figure 14B:
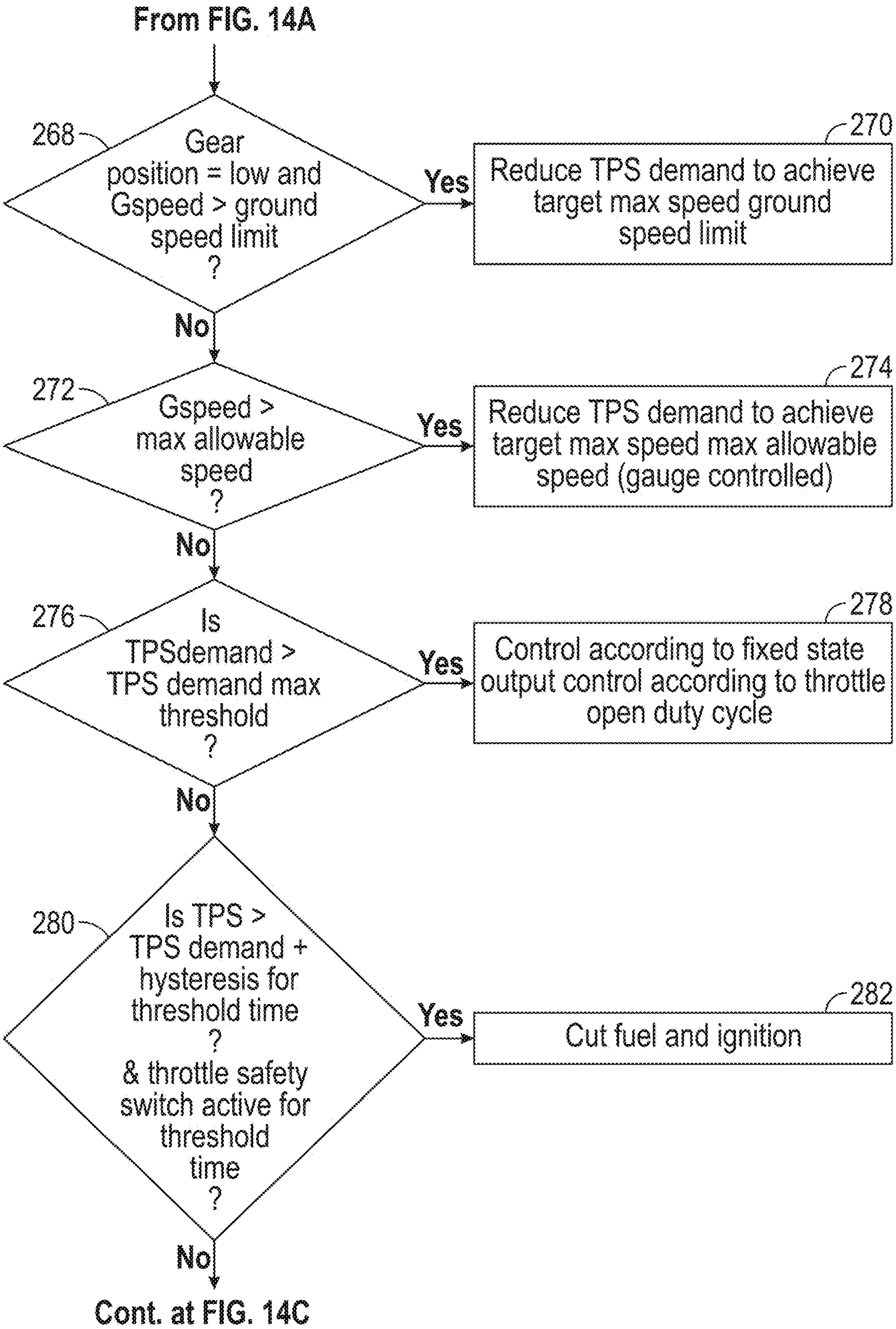
Figure 14C:
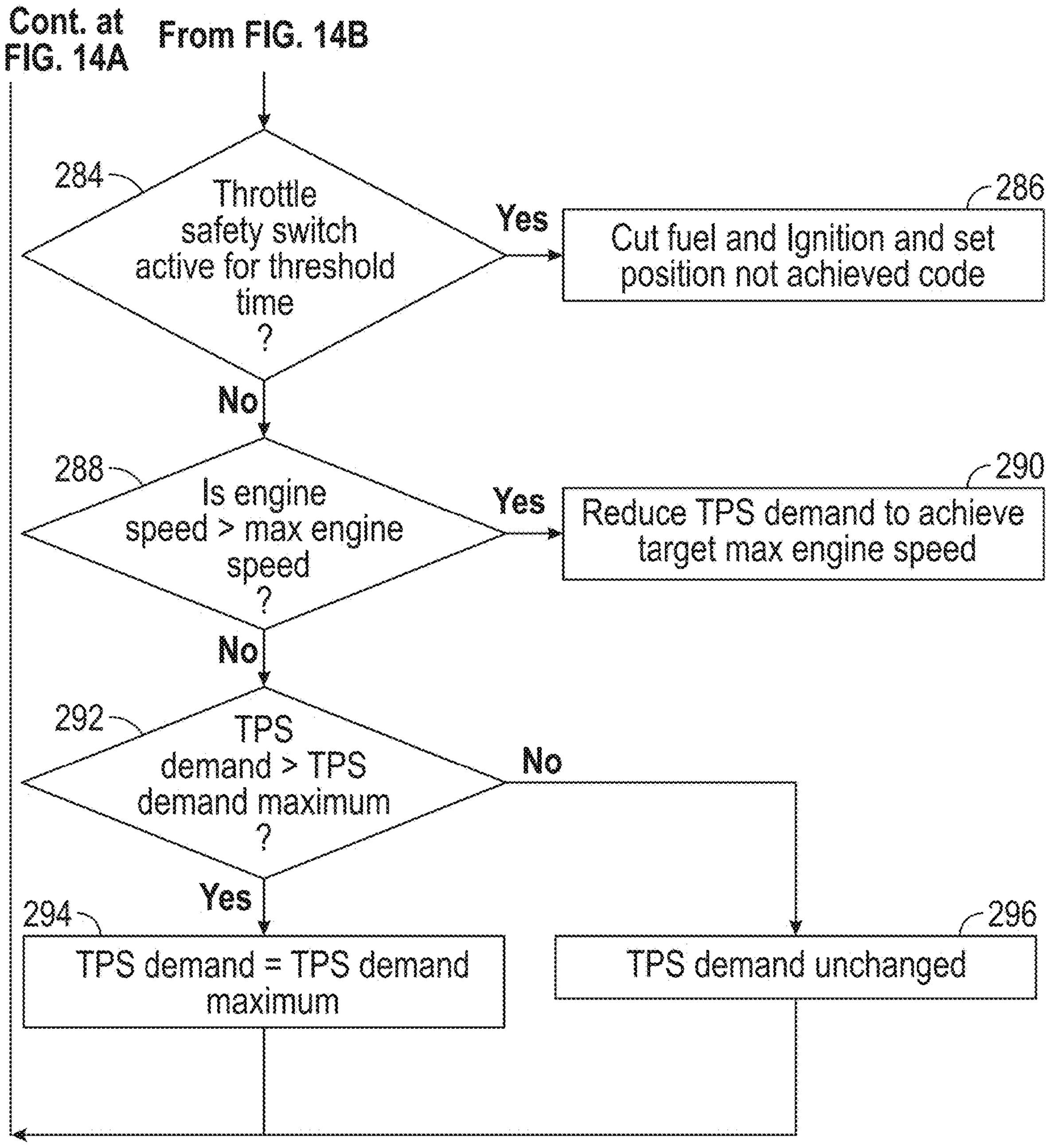

Referring to the flow chart of FIG. 14, which includes FIGS. 14A to 14C, a method 240 for post-start-up throttle control by electronic throttle-control system 88 is depicted.

Referring specifically to FIG. 14A, at step 242, ECU 128 determines whether electronic throttle-control system 88 is enabled. If enabled, at step 246, a throttle position TP as demanded by ECU 128 based on throttle input ("TPS Demand") is compared to a predetermined idle throttle position ("Idle TPS Conditional") and engine speed ES is compared to a predetermined engine-idle speed ("Idle Speed Conditional"). When the ECU-demanded throttle position TP is less than the predetermined idle throttle position and engine speed ES is less than the predetermine engine-idle speed, then at step 248, ECU 128 determines whether an electronic throttle control (ETC) idle PID control loop is enabled.

When the electronic throttle control (ETC) idle PID control loop is not enabled, then electronic throttle-control system 88 controls throttle valve actuator 96 and throttle valves 94 according to a fixed-state output based on a throttle-closed duty cycle. In other words, the throttle position is set to a fixed position which is substantially closed.

When the electronic throttle control (ETC) idle PID control loop is enabled, then after an idle control transition time, such as described at steps 210 and 212 of the method of FIG. 12, electronic throttle-control system 88 controls throttle valve actuator 96 and throttle valves 94 according to an idle PID control loop executed by ECU 128 and electronic throttle-control system 88.

At step 246, when the ECU-demanded throttle position TP is not less than the predetermined idle throttle position and engine speed ES is not less than the predetermine engine-idle speed, then at 254, a throttle-control translation map ("throttle map") is selected. As described above, a throttle map describes a relationship between a plurality of throttle-inputs and a plurality of corresponding throttle outputs. A throttle may be selected by an operator of snowmobile 10 interacting with operator inputs 120, which is them implemented by ECU 128, or may be selected by ECU 128 based on operator input, prior selected maps, a predetermined stored default throttle map, saved throttle-map selection history, and/or other factors.

At step 256, a throttle position TP1 is set by electronic throttle-control system 88 based at least in part on the selected throttle map.

At step 258, ECU 128 receives input from gear sensor 136 (see also, FIG. 7) to determine whether a gear position of snowmobile 10 is in a low position. When the gear position is in the low position, at step 260, the throttle position TP is set to a throttle position corresponding to a low-gear throttle position, which may be different than the throttle position TP as set at step 256 before the low-gear check; and when the gear position is not in the low position, the throttle position remains as set at step 256.

At step 264, a series of faults are checked by ECU 128. If any faults are detected, then at step 266, throttle position TP is set to a predetermined throttle position setting based on the particular fault detected. ECU 128 may be configured to determine whether any of a number of faults relating to engine 50 or other snowmobile 10 systems have occurred. Such faults may include: low ECU voltage, low or high engine temperature, problematic spark/detonation, oil pump operation or pressure, unrealistic barometric pressure, unrealistic outside air temperature, high exhaust temperature, low fuel pressure, riding with brakes on, and other faults.

Referring also to FIG. 14B, if no faults are detected, then at step 268, ECU 128 receives vehicle ground speed data from vehicle-speed sensor 134, and determines whether a detected ground speed is greater than a ground-speed limit, and when the gear position is also detected as being in a low position, then at step 270, changing the throttle position TP, i.e., TPS Demand, to reduce air flow through throttle valves 94 so as to achieve a target maximum low-gear ground speed for snowmobile 10.

Otherwise, at step 272, ECU determines whether the vehicle ground speed is greater than a predetermined allowable ground speed. When the vehicle ground speed is greater than the predetermined allowable ground speed, then at step 274, ECU 128 and electronic throttle-control system 88 changes the throttle valve position to reduce air flow to achieve a target maximum allowable vehicle ground speed. In an embodiment, the target allowable vehicle ground speed may be controlled by an operator interacting with operator inputs 120, which may include gauge 166.

When the vehicle ground speed is not greater than the predetermined allowable ground speed, then at step 276, ECU 128 compares the current TPS Demand or throttle position TP to a throttle position maximum threshold. When the ECU demanded throttle position is greater than a maximum throttle position threshold. ECU 128 and electronic throttle-control system 88 controls the throttle according to a fixed state pout control based on a throttle-open duty cycle. In other words, when an operator actuates throttle-input device 80 to request maximum throttle, and ECU 128 determines a corresponding throttle position TP, if that demanded throttle position exceeds a predetermined maximum throttle position, then electronic throttle-control system 88 and ECU 128 set the throttle position according to a predetermined fixed position corresponding to an open position of throttle valves 94.

At step 280, when TPS Demand is not greater than the TPS Demand maximum threshold, then ECU 128 determines whether an actual throttle valve position detected by throttle-position sensor 142 is greater than the throttle position demanded or determined by ECU 128 plus a hysteresis factor, for a predetermined period of time, and also whether a throttle-safety switch is active for a predetermined period of time. If yes, this indicates a fault in engine throttle control, such as a throttle valve 94 being stuck in an open position, and fuel and engine ignition are cut so as to cease operation of engine 50.

Referring also to FIG. 14*c*, when such conditions are not met at step 280, then at step 284, a throttle safety switch is checked by ECU 128. If the throttle safety switch is active, meaning a throttle fault, is active for a predetermined threshold period, then at step 286, fuel flow and ignition are cut, and in some embodiments, a code indicated that a throttle set position was not achieved may be stored and/or displayed.

When ECU 128 does not detect the safety switch conditions of step 284, then at step 288, another check by ECU 128 is conducted. At step 288, ECU 128 determines whether engine speed ES is above a predetermined maximum engine speed. If it is, then at step 290, ECU 128 and electronic throttle-control system 288 reduces throttle, i.e., changes a throttle position TP to reduce air flow, so as to achieve the predetermined target maximum engine speed.

When engine speed ES is not above the predetermined maximum engine speed, then at step 292, ECU 128 determines whether the demanded throttle position is greater than an allowable maximum throttle demand. If not, at step 296, the throttle demanded or throttle position TP determined by ECU 128 is left unchanged. However, if the demanded throttle position is above the maximum, then at step 294, electronic throttle-control system 88 controls and reduces the throttle position such that the throttle position corresponds to the predetermine maximum throttle position.

Following either of steps 294 or 296, the process reverts to step 256 (FIG. 14A), where electronic throttle-control system 88 continues to monitor and set the throttle position as described above with respect to FIGS. 14A-14C.

Figure 15:
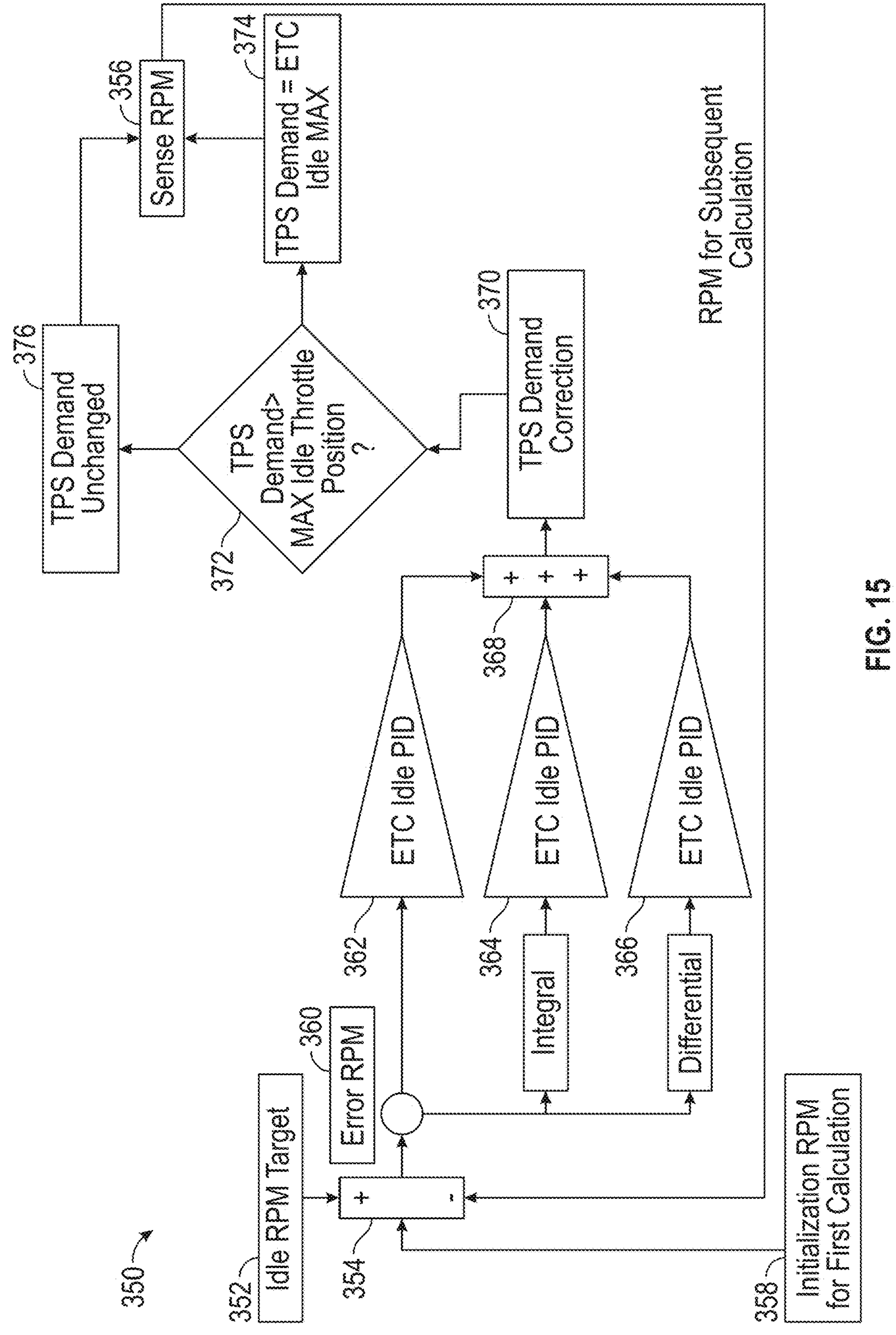
FIG. 15 is a block diagram of an idle PID throttle control loop, according to an embodiment of the disclosure.

Referring to FIG. 15, an engine-idle PID controller and control loop method 350 for electronic throttle control implemented by electronic throttle-control system 88 is depicted and described. Engine-idle PID loop 350 embodies methods of controlling engine 50 idle at or near the idle set point, which includes methods of controlling electronic throttle-control system 88 to dynamically position throttle valves 94 to control air flow through throttle body 90. Executable instructions for the method steps may be saved in a memory of electronic throttle-control system 88, including ECU 128, with a processor executing the saved instructions.

As will be understood by one of ordinary skill, engine-idle speed is the process variable to be measured and controlled. Consequently, engine-idle speed target or set-point value 356, which may be defined in engine RPM, is input into comparator 354. Actual or sensed engine-speed is also input into comparator 354, although initially, a first or initial engine-idle speed at step 358 is input for the first calculation. In an embodiment, sensed engine-idle speed at step 356 is transmitted from engine-speed sensor 140 and received by ECU 128 for processing as part of the idle PID control loop.

Comparator 354 compares sensed engine-idle speed with the target engine-idle speed 352, and outputs engine-idle speed error 360. The function of comparator 354 may be performed by a processor of ECU 128, as will be understood by one of ordinary skill in the art.

Proportional, integral and differential gains 362, 364 and 366 are determined based on the respective proportional, integral and differential components of error 360, then summed at step 368 to determine a corrected throttle position at step 370 which is intended to achieve the target engine-idle speed. At step 372, the corrected throttle position is compared to a maximum idle throttle position.

At step 374, when the corrected throttle position is greater than a predetermined throttle position that achieves a maximum engine-idle speed, then the throttle position is set to the throttle position to cause maximum engine-idle speed in ECU 128, and electronic throttle-control system 88 adjusts a throttle position to the throttle position to achieve maximum engine-idle speed.

At step 376, when the corrected throttle position is not greater than a predetermined throttle position that achieves a maximum engine-idle speed, then the throttle position remains set to the corrected throttle position and electronic throttle-control system 88 adjusts a throttle position to the corrected throttle position.

Engine-speed is checked again at step 356, and analyzed by comparator 354, and the loop analysis is repeated.

The following clauses illustrate the subject matter described herein.

Clause 1. An electronic throttle control system that includes: an electronic control unit (ECU) including a processor and a memory device storing at least one throttle-control translation map; a throttle-input sensor in electrical communication with the ECU and configured to sense an input from an operator-actuated throttle device; and a 2-stroke internal-combustion engine. The 2-stroke internal-combustion engine may include: an electronic throttle-valve actuator in electrical connection with the ECU and having an actuator motor and gear train; a throttle body for controlling airflow to one or more combustion chambers of the 2-stroke internal-combustion engine, the throttle body defining a first throttle bore and a second throttle bore; a first throttle valve in the first throttle bore and a second throttle valve in the second throttle bore; and a throttle valve control shaft coupled to the first throttle valve and the second throttle valve, and to the gear train, such that movement of the actuator motor and gear train causes the throttle valve control shaft to rotate and move the first and second throttle valves; a throttle-position sensor in electrical communication with the ECU and configured to sense an actual position of the first and second throttle valves. Further, the ECU may be configured to receive a signal representing a throttle-position input from the throttle-input sensor and to determine a throttle-demand position corresponding to a position of the first throttle valve in the first throttle bore and a position of the second throttle valve in the second throttle bore, based on the throttle-position input and throttle-control translation map.

Clause 2. The electronic throttle control system of clause 1, further comprising an engine-speed sensor in electrical communication with the ECU and configured to sense a speed of the 2-stroke internal-combustion engine.

Clause 3. The electronic throttle control system of clause 2, wherein the ECU is configured to control the actuator during a start mode to decrease the throttle output when a sensed speed of the 2-stroke internal-combustion engine is less than an engine-speed threshold.

Clause 4. The electronic throttle control system of clause 1, wherein the ECU is configured to limit a throttle-demand position based on ground speed, engine speed, and/or user-selected limit parameters or fault-state limit positions.

Clause 5. The electronic throttle control system of clause 1, wherein a bore diameter of the first throttle bore is substantially the same as a bore diameter of the second throttle bore and a throttle-bore pitch of the first throttle bore to the second throttle bore is greater than twice the bore diameter.

Clause 6. The electronic throttle control system of clause 5, wherein the bore pitch is in a range of 100 mm to 200 mm.

Clause 7. The electronic throttle control system of clause 6, wherein the bore pitch is in a range of 130 mm to 140 mm.

Clause 8. A snowmobile, comprising the electronic throttle control system of any of clauses 1-7.

Clause 9. Another embodiment of the disclosure is a method of controlling a starting mode of snowmobile having an electronic-control unit (ECU) with a processor, and a 2-stroke combustion engine with an electronic throttle body having a first throttle valve, a second throttle valve, a throttle-position sensor, and an actuator for actuating the first and second throttle valves. The method includes the steps of: determining whether an electronic throttle body drive-voltage generated by the 2-stroke combustion engine is above a threshold voltage; determining whether an engine speed of the 2-stroke combustion engine is above a first engine-speed threshold; when the generated voltage is at or above the critical threshold voltage and the speed of the 2-stroke combustion engine is above a threshold engine-speed threshold, setting a throttle position of the first throttle valve and the second throttle valve to a neutral-throttle position: after a predetermined period of time, determine whether the engine speed is greater than a second engine-speed threshold; and when the engine speed is greater than the second engine-speed threshold, changing a position of the first throttle valve and the second throttle valve from the neutral-throttle position to an initial throttle-operating position, by controlling the actuator with the processor of the ECU.

Clause 10. The method of clause 9, further comprising initializing the processor of the ECU.

Clause 11. The method of clause 9, wherein in the neutral-throttle position, an effective area of each of the first throttle valve and the second throttle valve is greater than a respective effective area of the first throttle valve and the second throttle valve in the initial throttle-operating position.

Clause 12. The method of clause 11, further comprising setting a position of the first throttle valve and the second throttle valve to the neutral-throttle position using a spring to bias the first and second throttle valves.

Clause 13. The method of clause 12, wherein changing a position of the first throttle valve and the second throttle valve from the neutral position to an initial throttle-operating position comprises the processor controlling the actuator to move the first throttle valve and the second throttle valve to the initial throttle-operating position in opposition to a force exerted by the biasing spring.

Clause 14. The method of clause 9, wherein in the neutral-throttle position, an effective area of each of the first throttle valve and the second throttle valve is less than a respective effective area of each of the first throttle valve and the second throttle valve in the initial throttle-operating position, and changing a position of the first throttle valve and the second throttle valve from the neutral-throttle position to the initial throttle-operating position includes further increasing the effective area of the first throttle valve and the second throttle valve while the voltage is increasing and below the critical voltage threshold.

Clause 15. Yet another embodiment of the disclosure includes a method of controlling a snowmobile having an electronic-control unit (ECU) with a processor, a memory storing one or more throttle-control translation maps, and a 2-stroke combustion engine with an electronic throttle body having a first throttle valve, a second throttle valve, a throttle-position sensor, an actuator for actuating the first and second throttle valves, and an engine-speed sensor. In this embodiment, the method includes: storing a predetermined idle-speed throttle-valve position and the one or more throttle-control translation maps in the memory; determining with the ECU a throttle-demand valve position, the throttle-demand valve position corresponding to a throttle-demand valve effective area of the first and second throttle valves; comparing the throttle-demand valve position to the predetermined idle-speed throttle-valve position; receiving at the ECU, an output of the engine-speed sensor indicating an actual engine speed of the 2-stroke internal-combustion engine; comparing the actual engine speed with a predetermined engine-idle speed; selecting a throttle-control translation map stored in the memory when the throttle-demand position effective flow area is greater than the predetermined idle-speed throttle position effective flow area and when the actual engine speed is greater than the predetermined idle engine speed; controlling the actuator using the ECU to set a first position of the first throttle valve in the first throttle bore and a first position of the second throttle valve in the second throttle bore based on the selected throttle-control translation map: determining whether an engine fault is present and controlling the actuator using the ECU to set a second position of the first throttle valve in the first throttle bore and a second position of the second throttle valve in the second throttle bore when a fault is present; and determining whether a ground speed or engine speed exceeds a maximum speed limit and controlling the actuator using the ECU to set a third position of the first throttle valve in the first throttle bore and a third position of the second throttle valve in the second throttle bore to reduce ground speed or engine speed to be less than the maximum speed limit.

Clause 16. The method of clause 15, further comprising controlling the first and second throttle valves to maintain an engine idle speed when the throttle-demand position effective flow area is less than the predetermined idle-speed throttle position effective flow area and when the actual engine speed is less than the predetermined idle engine speed.

Clause 17. The method of clause 15, further comprising determining whether a gear position of the snowmobile is a low-gear position, and setting a position of the first and second throttle valves to a low-gear throttle position when the gear position of the snowmobile is a low-gear position.

Clause 18. The method of clause 15, further comprising setting a position of the first and second throttle valves to a fixed-state throttle position when a throttle-demand effective flow area exceeds a throttle-demand maximum threshold.

Clause 19. The method of clause 15, further comprising comparing an actual throttle position of the first and second throttle valves as indicated by the throttle-position sensor to a throttle-demand position, and causing the ECU to cease engine fuel flow and/or ignition when the actual throttle position effective flow area is greater than the throttle-demand position effective flow area for a predetermined period of time.

Clause 20. The method of clause 15, further comprising determining, when the snowmobile includes a safety switch, that the safety switch is active for greater than a predetermined period of time, and in response, causing the ECU to cease engine fuel injection and/or ignition.

Clause 21. The electronic throttle control system of clause 1, wherein the bore diameter is in a range of about 40 mm to about 60 mm.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An electronic throttle-control system for a snowmobile, comprising:

an electronic control unit (ECU) including a processor and a memory device storing at least one throttle-control translation map;

a throttle-input sensor in electrical communication with the ECU and configured to sense an input from an operator-actuated throttle device;

a 2-stroke internal-combustion engine, including:

an electronic throttle-valve actuator in electrical connection with the ECU and having an actuator motor and gear train;

a throttle body for controlling airflow to one or more combustion chambers of the 2-stroke internal-combustion engine, the throttle body defining a first throttle bore and a second throttle bore;

a first throttle valve in the first throttle bore and a second throttle valve in the second throttle bore; and a throttle valve control shaft coupled to the first throttle valve and the second throttle valve, and to the gear train, such that movement of the actuator motor and gear train causes the throttle valve control shaft to rotate and move the first and second throttle valves;

a throttle-position sensor in electrical communication with the ECU and configured to sense an actual position of the first and second throttle valves;

wherein the ECU is configured to receive a signal representing a throttle-position input from the throttle-input sensor and to determine a throttle-demand position corresponding to a position of the first throttle valve in the first throttle bore and a position of the second throttle valve in the second throttle bore, based on the throttle-position input and throttle-control translation map, and wherein the ECU is configured to:

limit a throttle-demand position based on at least one of ground speed, user-selected limit parameters, or fault-state limit positions; and transition from the idle control mode to a translation-map control mode when:

the throttle-demand position exceeds a predetermined idle throttle threshold, and the engine speed exceeds a predetermined idle engine-speed threshold.

2. The electronic throttle control system of claim 1, further comprising an engine-speed sensor in electrical communication with the ECU and configured to sense a speed of the 2-stroke internal-combustion engine.

3. The electronic throttle control system of claim 2, wherein the ECU is configured to control the actuator during a start mode to decrease the throttle output when a sensed speed of the 2-stroke internal-combustion engine is less than an engine-speed threshold.

4. The electronic throttle control system of claim 1, wherein the ECU is further configured to:

limit a throttle-demand position based on engine speed.

5. The electronic throttle control system of claim 1, wherein a bore diameter of the first throttle bore is substantially the same as a bore diameter of the second throttle bore and a throttle-bore pitch of the first throttle bore to the second throttle bore is greater than twice the bore diameter.

6. The electronic throttle control system of claim 5, wherein the bore pitch is in a range of 100 mm to 200 mm.

7. The electronic throttle control system of claim 1, wherein the bore diameter is in a range of 40 mm to 60 mm.

8. A snowmobile, comprising the electronic throttle control system of claim 1.

9. The electronic throttle control system of claim 1, wherein the memory stores a plurality of throttle-control translation maps defining different relationships between throttle-position input and throttle-demand position, and wherein the ECU is configured to selectively implement one of the plurality of throttle-control translation maps based on a user-selected operating mode.

10. The electronic throttle control system of claim 9, wherein at least one of the plurality of throttle-control translation maps is configured such that, for at least a portion of a throttle-position input range, the throttle-demand position exceeds the throttle-position input.

11. The electronic throttle control system of claim 9, wherein at least one of the plurality of throttle-control translation maps is configured such that, for at least a portion of a throttle-position input range, the throttle-demand position is less than the throttle-position input.

12. The electronic throttle control system of claim 1, wherein the ECU is configured to:

compare the throttle-demand position to a predetermined idle throttle position stored in the memory; and when the throttle-demand position is less than the predetermined idle throttle position and a detected engine speed is less than a predetermined idle engine-speed threshold, control the actuator according to an idle control mode to maintain the engine speed at a target idle speed.

13. The electronic throttle control system of claim 1, wherein the ECU is configured to:

compare an actual throttle position detected by the throttle-position sensor to the throttle-demand position; and discontinue fuel injection and/or ignition of the 2-stroke internal-combustion engine when the actual throttle position exceeds the throttle-demand position for greater than a predetermined time interval.

14. The electronic throttle control system of claim 1, further comprising a vehicle-speed sensor configured to detect a ground speed of the snowmobile, wherein the ECU is configured to override the throttle-control translation map and command a reduced throttle-demand position when the detected ground speed exceeds a predetermined maximum ground-speed limit.

15. An electronic throttle-control system for a snowmobile having a 2-stroke internal-combustion engine, comprising:

an electronic control unit (ECU) including a processor and a memory storing:

a plurality of throttle-control translation maps defining different non-identical relationships between a throttle-position input and a throttle-demand position, and an idle-speed control routine configured to maintain engine speed at a target idle speed;

a throttle-input sensor configured to detect a position of an operator-actuated throttle device and generate a throttle-position input signal;

a vehicle-speed sensor configured to detect a ground speed of the snowmobile;

an engine-speed sensor configured to detect a speed of the 2-stroke internal-combustion engine;

a throttle body defining a first throttle bore and a second throttle bore;

a first throttle valve disposed in the first throttle bore and a second throttle valve disposed in the second throttle bore;

a common throttle shaft coupling the first throttle valve and the second throttle valve;

an electronic throttle-valve actuator coupled to the common throttle shaft and in electrical communication with the ECU; and a throttle-position sensor configured to detect an actual position of the first and second throttle valves;

wherein the ECU is configured to:

select one of the plurality of throttle-control translation maps based on a user-selected operating mode;

determine the throttle-demand position based on the selected throttle-control translation map and the throttle-position input signal;

operate in an idle control mode when the throttle-demand position is below a predetermined idle threshold and the engine speed is below a predetermined idle engine-speed threshold; and transition from the idle control mode to a translation-map control mode when:

the throttle-demand position exceeds a predetermined idle throttle threshold, and the engine speed exceeds a predetermined idle engine-speed threshold.

16. The electronic throttle-control system of claim 15, wherein at least one of the plurality of throttle-control translation maps defines, over at least a portion of a throttle-position input range, a throttle-demand position that is greater than the throttle-position input.

17. The electronic throttle-control system of claim 15, wherein the ECU is configured to override the selected throttle-control translation map when the engine speed exceeds a predetermined maximum engine-speed threshold and to command a reduced throttle-demand position to maintain engine speed below the predetermined maximum engine-speed threshold.

* * * * *